United States Patent [19]

Mondrik et al.

[11] Patent Number: 5,627,998

[45] Date of Patent: May 6, 1997

[54] SYSTEM AND METHOD FOR MAPPING CALLS TO FUNCTIONS IN A FIRST DRIVER LEVEL LIBRARY TO A SESSION-BASED INSTRUMENTATION CONTROL DRIVER LEVEL SYSTEM

[75] Inventors: Dan Mondrik; Bob Mitchell, both of Austin, Tex.

[73] Assignee: National Instruments Corporation, Austin, Tex.

[21] Appl. No.: 449,391

[22] Filed: May 24, 1995

Related U.S. Application Data

[63] Continuation-in-part of Ser. No. 238,480, May 4, 1994.

[51] Int. Cl.$^6$ ............................................... G06F 13/00
[52] U.S. Cl. ............................................................ 395/500
[58] Field of Search .................................... 395/500, 650, 395/700, 600, 200

[56] References Cited

U.S. PATENT DOCUMENTS

| | | | |
|---|---|---|---|
| 5,155,836 | 10/1992 | Jordan et al. | 395/500 |
| 5,165,020 | 11/1992 | Sudama et al. | 395/200 |
| 5,265,239 | 11/1993 | Ardolino | 395/500 |
| 5,442,779 | 8/1995 | Barber et al. | 395/600 |
| 5,475,836 | 12/1995 | Harris et al. | 395/600 |

OTHER PUBLICATIONS

*NI-VXI™ Software Reference Manual for C VXI Bus*, Oct. 1994 Edition, Part No. 320307–01, Copyright 1991, 1994 National Instruments Corporation, pp. 1–1 through 13–6.

*Primary Examiner*—Kevin J. Teska
*Assistant Examiner*—Vuthe Siek
*Attorney, Agent, or Firm*—Jeffrey C. Hood; Conley, Rose & Tayon, P.C.

[57] ABSTRACT

A system and method for enabling applications written for NI-VXI driver level software to operate with a session-based VISA system. The present invention receives driver level function calls from applications developed for the NI-VXI driver level library, opens sessions to the appropriate VISA resources and performs the necessary operations on these resources. This enables a VISA system to operate in conjunction with applications written for the NI-VXI driver level library. When a call to the NI-VXI function InitVXIlibrary is received, the method allocates one or more arrays which are used later for storing session identifiers to sessions created to corresponding VISA resources. When the system later receives a call to a function in the NI-VXI driver level library, the method first determines which VISA resources correspond to this function. The method either opens sessions to these resources or retrieves the session parameters from the respective arrays if sessions have already been created. The method performs one or more operations on the VISA resources to perform the functionality indicated by the function called in the NI-VXI library. In many instances, the method of the present invention is required to invoke multiple VISA operations to perform the desired functions indicated by a call to a single NI-VXI function. When a call to the NI-VXI function CloseVXIlibrary is received, the method closes all sessions to VISA resources.

47 Claims, 22 Drawing Sheets

Example VISA Configuration

Example VISA Distributed Configuration

VISA Resource Classes vs. VISA Resources

| Address 0 | Address 24 | Address 51 |
|---|---|---|
| CPU | VXI Message Based Device | VXI Register Based Device |

Resource Classes Implemented
---
Read
Write
High Level Access
VXIbus Interrupt

SYSTEM AND METHOD FOR MAPPING CALLS TO FUNCTIONS IN A FIRST DRIVER LEVEL LIBRARY TO A SESSION-BASED INSTRUMENTATION CONTROL DRIVER LEVEL SYSTEM

This is a continuation-in-part of co-pending application Ser. No. 08/238,480 titled "Method and Apparatus for Controlling an Instrumentation System" filed May 4, 1994, whose inventors were Bob Mitchell, Hugo Andrade, Jogen Pathak, Samson DeKey, Abhay Shah, and Todd Brower, and which was assigned to National Instruments Corporation.

| TABLE OF CONTENTS | |
|---|---|
| Description of the Related Art | 1 |
| Summary of the Invention | 9 |
| Brief Description of the Drawings | 11 |
| Detailed Description of the Preferred Embodiment | 13 |
| Instrumentation I/O Interface Options | 13 |
| Computer System Block Diagram | 14 |
| Software Architecture (Prior Art) | 15 |
| VISA Conversion | 15 |
| VISA Background | 16 |
| VISA System | 23 |
| Example VISA System | 27 |
| VISA Resource Manager | 28 |
| VISA System Operation | 34 |
| Operation Flowchart Descriptions | 36 |
| NI-VXI | 38 |
| Mapping System and Method | 38 |
| Conclusion | 44 |
| Claims | 45 |
| Abstract | 60 |

FIELD OF THE INVENTION

The present invention relates to I/O control software for instrumentation systems, and more particularly to a system and method for mapping calls to driver level function commands from applications developed for a first driver level library to a session-based instrumentation control driver level system.

DESCRIPTION OF THE RELATED ART

An instrument is a device which collects data or information from an environment or unit under test and displays this information to a user. An instrument may also perform various data analysis and data processing on acquired data prior to displaying the data to the user. Examples of various types of instruments include oscilloscopes, digital multimeters, pressure sensors, etc., and the types of information which might be collected by respective instruments include voltage, resistance, distance, velocity, pressure, frequency of oscillation, humidity or temperature, among others.

In the past, many instrumentation systems comprised individual instruments physically interconnected with each other. Each instrument typically included a physical front panel with its own peculiar combination of indicators, knobs, or switches. A user generally had to understand and manipulate individual controls for each instrument and record readings from an array of indicators. Acquisition and analysis of data in such instrumentation systems was tedious and error prone. An incremental improvement in the manner in which a user interfaced with various instruments was made with the introduction of centralized control panels. In these improved systems, individual instruments were wired to a control panel, and the individual knobs, indicators or switches of each from panel were either preset or were selected to be presented on a common front panel.

A significant advance occurred with the introduction of computers to provide more flexible means for interfacing instruments with a user. In such computerized instrumentation systems, the user interacts with software executing on the computer system through the computer's video monitor rather than through a manually operated front panel to control one or more real world instruments. The software executing on the computer system can be used to simulate the operation of an instrument in software or to control or communicate with one or more real world instruments, these software created/controlled instruments being referred to as virtual instruments.

Therefore, modern instrumentation systems are moving from dedicated stand-alone hardware instruments such as oscilloscopes, digital multimeters, etc., to a concept referred to as virtual instrumentation. Virtual instrumentation comprises general purpose personal computers and workstations combined with instrumentation software and hardware to build a complete instrumentation system. In a virtual instrumentation system, a virtual instrument operating on a central computer controls the constituent instruments from which it acquires data which it analyzes, stores, and presents to a user of the system. Computer control of instrumentation has become increasingly desirable in view of the increasing complexity and variety of instruments available for use, and computerized instrumentation systems provide significant performance efficiencies over earlier systems for linking and controlling test instruments.

The various hardware interface options currently available for instrumentation systems can be categorized into four distinct types, including IEEE 488-controlled instruments (GPIB instruments), VXI bus instruments, plug-in data acquisition (DAQ) boards, and RS-232-controlled (serial) instruments. Background on these various hardware interface options is deemed appropriate.

The GPIB (general purpose interface bus) began as a bus designed by Hewlett-Packard in 1965, referred to as the Hewlett-Packard Interface Bus (HPIB), to connect their line of programmable instruments to their computers. National Instruments Corporation expanded the use of this bus to computers manufactured by companies other than Hewlett-Packard and hence the name General Purpose Interface Bus (GPIB) became more widely used than HPIB. The GPIB interface bus gained popularity due to its high transfer rates and was later accepted as IEEE standard 488-1975, and the bus later evolved to ANSI/IEEE standard 488.1-1987. In order to improve on this standard, two new standards were drafted, these being ANSI/IEEE 488.2-1987 and the SCPI (Standard Commands for Programmable Instruments) standard. The IEEE 488.2 standard strengthened the original standard by defining precisely how controllers and instruments communicated. The IEEE 488.2 standard removed ambiguities of the IEEE 488.1 standard by defining data formats, status reporting, a message exchange protocol, IEEE 488.2 controller requirements, and common configuration commands to which all IEEE 488.2 instruments must respond in a precise manner. Thus, the IEEE 488.2 standard created more compatible, more reliable systems that were simpler to program. In 1990, a new specification was developed referred to as the Standard Commands for Programmable Instruments (SCPI), which used the command structures defined in the IEEE 488.2 standard and formed a single, comprehensive programming command set that is used with any SCPI instrument. The SCPI standard simplified the programming process for manufacturers and users alike. Rather than having to learn a different command set for each instrument, the user could focus on solving the measurement tests of his or her application, thus decreasing programming time.

The VXI (VME eXtension for Instrumentation) bus is a platform for instrumentation systems that was first introduced in 1987 and was originally designed as an extension of the VME bus standard. The VXI standard has experienced tremendous growth and acceptance around the world and is used in a wide variety of traditional test and measurement and ATE applications. The VXI standard uses a mainframe chassis with a plurality of slots to hold modular instruments on plug-in boards. The VXI architecture is capable of interfacing with both message based instruments and register based instruments. A message based instrument is an instrument which is controlled by a string of ASCII characters, whereas a register based instrument is controlled by writing a bitstream of 1's and 0's directly to registers in the instrument hardware.

An instrumentation system using a data acquisition interface method typically includes transducers which sense physical phenomena from the process or unit under test and provide electrical signals to data acquisition hardware inside the computer system. The electrical signals generated by the transducers are converted into a form that the data acquisition board can accept, typically by signal conditioning logic positioned between the transducers and the data acquisition card in the computer system. A computer can also control an instrumentation system through the computer's serial or RS-232 port. There are currently thousands of instruments with an RS-232 interface.

Due to the wide variety of possible testing situations and environments, and also the wide array of instruments available, it is often necessary for a user to develop a program to control respective instruments in the desired instrumentation system. Therefore, implementation of such systems frequently require the involvement of a programmer to develop software for acquisition, analysis and presentation of instrumentation data.

The software architecture for a virtual instrumentation system comprises several components. The top level of the software architecture typically comprises an applications program used for high level control of the virtual instrument. Examples of high level applications programs for instrumentation control are LabVIEW and LabWindows from National Instruments Corp. Other examples of applications programs are HP VEE from Hewlett-Packard and Wavetest from Wavetek Corp. among others. These applications programs provide a user with the tools to control instruments, including acquiring data, analyzing data, and presenting data.

The applications programs mentioned above typically operate in conjunction with one or more instrument drivers to interface to actual physical instruments. For example, the LabVIEW and LabWindows applications software each include instrument libraries comprising drivers for more than three hundred GPIB, VXI, and RS-232 instruments from numerous manufacturers. The instrument drivers are designed to reduce a user's application development time by providing intuitive high level functions that relieve the user of complex low level instrument programming.

A software level referred to as driver level software is below the instrument driver level. Driver level software is used to interface the commands in the instrument driver to the actual hardware interface being used, such as a GPIB interface card, a data acquisition card, or a VXI card. In other words, driver level software handles the details of communication, i.e., the transfer of commands and data, over a physical connection between the computer and instruments. There have been many implementations of I/O control software, some of which were custom-developed by end users, while others were developed by vendors and sold along with interface hardware. Examples of driver level software include NI-488, NI-DAQ, and NI-VXI driver level software offered by National Instruments, Inc., which have become a de facto standard in the industry.

A primary problem with traditional driver level software is that there generally is no common look and feel and no common programming constructs. Because of various inconsistencies in driver level software, developers of instrument driver software, who many times are non-professional software engineers, typically do not use the full platform capabilities available, such as interrupt handling, register based control, and triggers. Further, developers of instruments driver software often do not include centralized management of resources, and thus instrument drivers may conflict. As a result, various implementations of instrument driver software do not use the full functionality of the instrument being controlled. Also, there is no common creation mechanism or requirements, no common source code and no common testing criteria.

One important requirement of I/O control software is referred to as I/O interface independence. When users write application software to control a specific set of instruments, they typically want their applications to work with a variety of hardware for a respective I/O interface, perhaps even supplied from different vendors. A user controlling GPIB instruments with a PC, for example, may want to use a plug-in GPIB card in one application and use an external SCSI-to-GPIB interface box in another application. A consistent I/O software interface for these two approaches would allow the user to do this without modifying his application software code.

Another aspect of interface independence has become of interest to more and more users, especially those who are using VXI technology. Rather than simply developing software that is hardware independent for a respective I/O interface, i.e., software for a particular GPIB instrument that is independent of the computer-to-GPIB interface hardware used, many users desire the ability to write software that is also independent of the type of I/O interface used, such as whether GPIB, VXI, serial or some other type of connection is used between the computer and the instrument. For example, a user may want to write one piece of software to control an instrument that has options for both GPIB and RS-232 control. As another example, a user may want to write software to control a VXI instrument and have that software work whether the computer is embedded in the VXI chassis, connected to VXI through the MXI bus, or connected to VXI through a GPIB-to-VXI translator.

Therefore, instrumentation programmers desire the ability to write software that is independent of hardware, operating system and I/O interface. It is also greatly desirable for the software API of an instrumentation system to have a common look and feel as well as more consistent implementations for cross-platform development and integration, cross-product development and integration, and the reusability of source code. Also, the new I/O control software architecture should not only provide access to new capabilities, but must also bridge with the past and provide a smooth migration path for the installed base and huge investment in existing systems.

One attempt to create a driver level software layer that is I/O interface independent is the Standard Instrument Control Library (SICL) developed by Hewlett-Packard Corp. SICL uses a methodology of creating APIs with interface independence that includes a purely top-down approach, which merges the capabilities of a group of hardware interfaces into a two-piece API. The first element of the API includes the overlap between all of the interfaces, referred to as the core, and the second element is the set of all of the interface-specific routines. The top down interface independence approach attempts to create a common API among two or more types of hardware interfaces. In other words, top down interface independence involves creating an API that uses the same set of functions for similar capabilities between different instrument control hardware, for example, making GPIB reads and writes use the same API functions as RS-232 reads and writes. The process of creating an interface independent API using the top-down approach involves determining the different hardware interfaces to combine, compiling a list of the capabilities of each of the hardware interfaces (read, write, abort, config, and so on), and merging these lists to create a list of overlapping, or core functionality.

U.S. patent application Ser. No. 08/238,480 titled "Method and Apparatus for Controlling an Instrumentation System" filed May 4, 1994 discloses a system referred to as the Virtual Instrument Software Architecture (VISA), which is being formulated as IEEE standard SCC-20. The VISA system is used for controlling instrumentation systems and for providing a user with the capability to develop instrument drivers and application software for controlling instrumentation systems. The system provides a software architecture which defines the control and management of an instrumentation system. The VISA system utilizes a device resource independence approach whereby the individual capabilities of devices are broken down into a plurality of objects called resources, and these resources are then used to develop instrument drivers or instrument control applications. The VISA system is independent of I/O interface type, operating system, and programming language while also providing a common look and feel and consistent API to the user. A VISA system provides a single I/O interface or library which enables a user to control all types of instruments using any of the various types of I/O interfaces.

It is desirable that applications developed for the NI-VXI driver level software be compatible with VISA driver level software. Therefore, a system and method is desired for mapping calls to driver level functions in the NI-VXI driver level library to a device resource based instrumentation control driver level system such as a VISA system. This would enable a VISA system to provide access to new capabilities while also providing a smooth migration path for the installed base and huge investment in existing NI-VXI based applications.

One particularly difficult area in mapping applications based on the NI-VXI driver level library to the VISA resource model is session management in a VISA system. In NI-VXI an application begins with a command referred to as InitVXIlibrary. This command makes all of the VXI libraries available to the application. In contrast, the VISA model is session based whereby sessions are opened to communicate with resources on an as-needed basis. In addition, the NI-VXI driver level library provides a different methodology for performing functions than does a VISA system. Therefore, a system and method is desired for mapping NI-VXI library function calls from the NI-VXI driver level library to the VISA driver level library.

SUMMARY OF THE INVENTION

The present invention comprises a system and method for enabling applications written for NI-VXI driver level software to operate with a session-based VISA system. The present invention comprises a system and method which receives driver level function calls from applications developed for the NI-VXI driver level library, opens sessions to the appropriate VISA resources and performs the necessary operations on these resources. This enables a VISA system to operate in conjunction with applications written for the NI-VXI driver level library.

As discussed in the background section, after an InitVXIlibrary function call is made in an NI-VXI application, all VXI libraries are accessible by an application. In contrast, the VISA model is session-based where a session must be opened to a resource in order to invoke operations on that resource. In addition, the NI-VXI driver level library provides a completely different methodology for performing functions than does a VISA system. According to the present invention, the system and method intelligently performs session management in a VISA system when mapping NI-VXI function calls to a VISA system.

When a call to the NI-VXI function InitVXIlibrary is received, the method allocates one or more arrays. The arrays are used later for storing session identifiers to sessions created to corresponding VISA resources. The method also preferably initializes these arrays to initial values, preferably zero values. In addition, the method preferably initializes arrays for interrupt handlers and sets these arrays to point to default handlers. The method of the invention also maintains a count variable which indicates how many times the function InitVXIlibrary has been called. The count variable is maintained so that arrays are only allocated the first time the InitVXIlibrary function is called.

When the system and method of the present invention later receives a call to a function in the NI-VXI driver level library, the method first determines which VISA resources correspond to this function. The determination of which resources correspond to an NI-VXI function call may be predetermined at compile time where a call to a function in the NI-VXI library automatically maps to one or more VISA resources. Alternatively, this determination may be made dynamically based on one or more parameters in the function call. The method then determines if sessions have been opened yet to these resources. If not, the method performs a viOpen instruction on the VISA resource manager and stores the received session identifier in a respective array. The present invention may also dynamically allocate arrays on an as needed basis to maintain the session identifier information. In one embodiment, the present invention intelligently manages sessions to VISA resources to consolidate and optimize the created sessions to conserve memory and increase system efficiency. If sessions have already been opened to the necessary VISA resources, then the method retrieves the session id parameters from the respective array. After creating the necessary sessions to the VISA resources, or if sessions have already been created, after retrieving the session ids from respective arrays, the method performs one or more operations on the VISA resources to perform the functionality indicated by the function called in the NI-VXI library. In many instances, the method of the present invention is required to invoke multiple VISA operations to perform the desired functions indicated by a call to a single NI-VXI function.

When a call to the NI-VXI function CloseVXIlibrary is received, the method examines the count variable and closes all sessions if this CloseVXIlibrary function call matches with a corresponding last InitVXIlibrary function call. In closing all sessions to VISA resources, the method examines all of the arrays to determine which sessions have been opened to VISA resources and performs a viClose operation on each open session.

Therefore, the present invention comprises a system and method for mapping driver level function calls from the NI-VXI driver level library to the VISA driver level library. This enables a VISA system to operate in conjunction with applications developed for the NI-VXI library.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

U.S. patent application Ser. No. 08/238,480 titled "Method and Apparatus for Controlling an Instrumentation System" filed May 4, 1994, whose inventors were Bob Mitchell, Hugo Andrade, Jogen Pathak, Samson DeKey, Abhay Shah, and Todd Brower, and which was assigned to National Instruments Corporation is hereby incorporated by reference in its entirety, including the appendices therein. The above-referenced patent application discloses a system referred to as the Virtual Instrument Software Architecture (VISA), which is being formulated as IEEE standard SCC-20.

Appendices

The present application includes two Appendices labeled Appendix 1 and Appendix 2. Appendix 1 is an NI-VXI to VISA mapping document which discloses the manner in which a non-VISA application, specifically an application developed for the NI-VXI driver level library, maps to a VISA system according to the preferred embodiment of the present invention. Appendix 2 comprises pseudocode for implementing the system and method according to the preferred embodiment of the present invention. Appendices 1 and 2 comprise part of this specification as though fully and completely set forth herein.

Instrumentation I/O Interface Options

Figure 1:
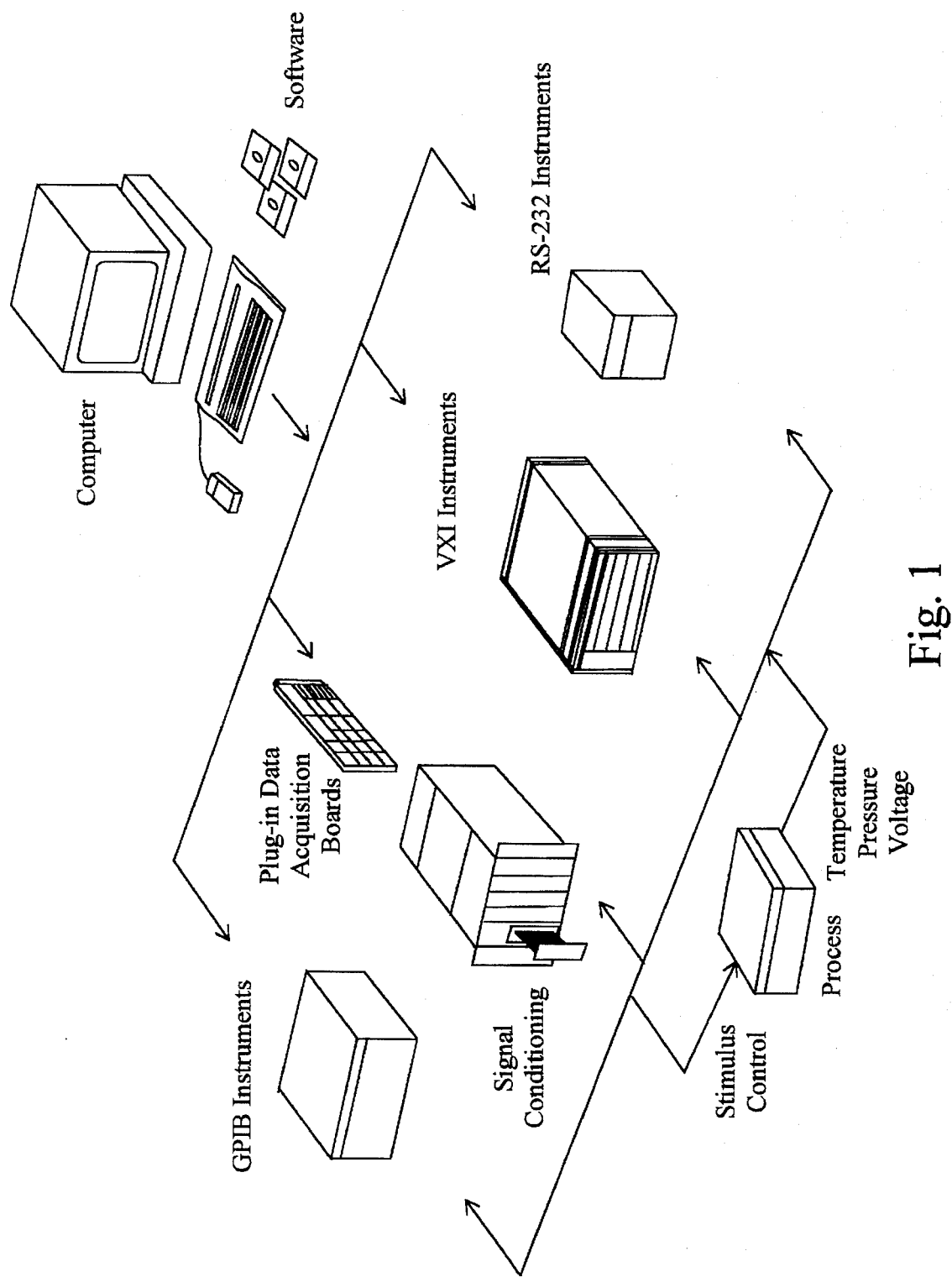
FIGS. 1 and 2 illustrate representative instrumentation control systems of the present invention including various I/O interface options.
Figure 2:
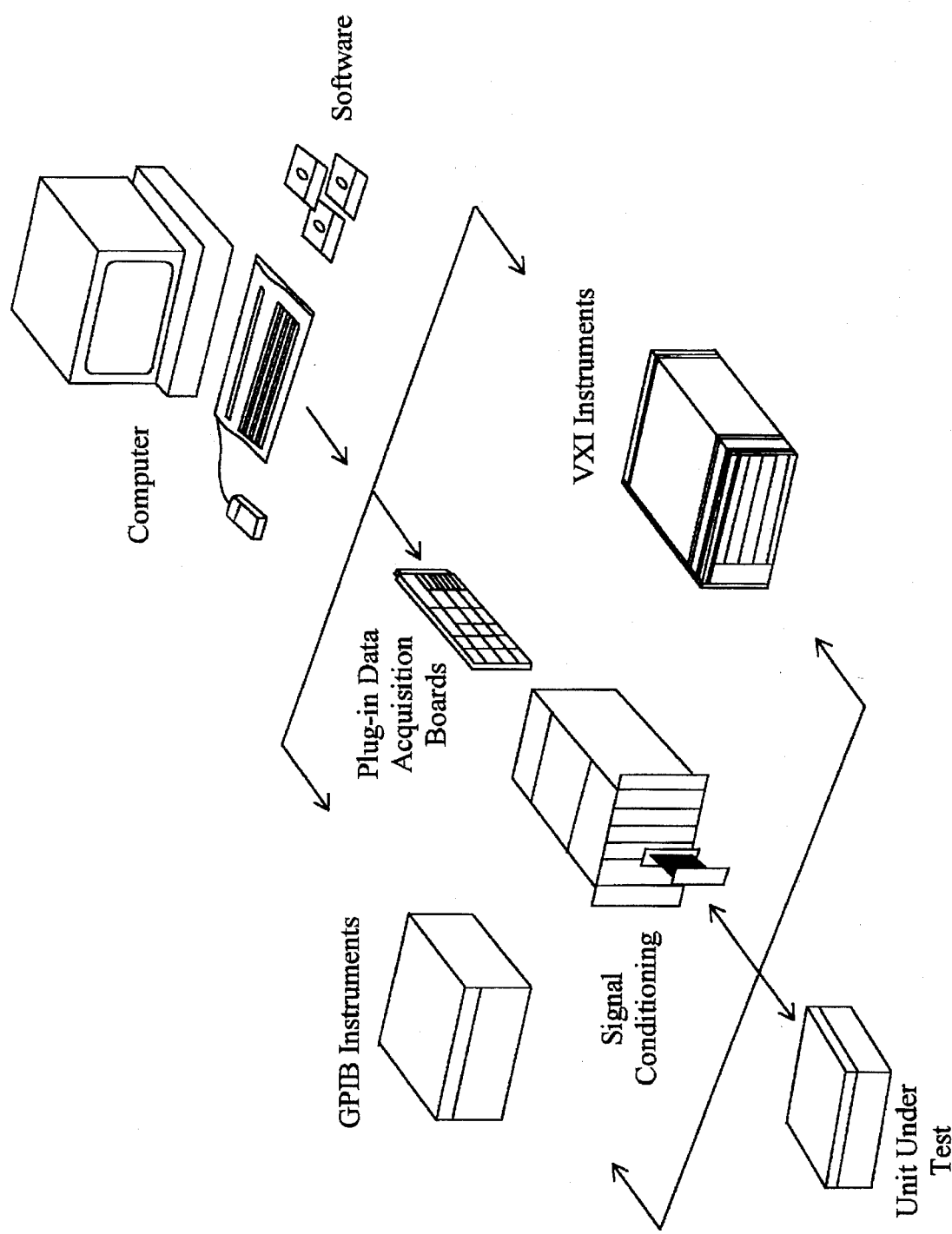

Referring now to FIGS. 1 and 2, the various hardware I/O interface options currently available for instrumentation systems are shown. FIG. 1 illustrates the choices available in a data acquisition and control application, and FIG. 2 illustrates the choices available in a test and measurement application. As shown, a computer system can interface with a process or unit under test using a number of methods, including IEEE 488-controlled instruments (GPIB instruments), plug-in data acquisition (DAQ) boards, RS-232-controlled (serial) instruments, and VXI bus instruments. In the present disclosure, the term "instrument" is used to refer to "traditional" instruments such as GPIB instruments and RS-232 instruments as well as VXI bus instruments configured as plug-in cards to a VXI backplane. The term "instrument" is also used to refer to a data acquisition board in a computer system. In addition, the term "instrument" also refers to "virtual instruments" (combinations of hardware and/or software instruments) executing on a computer system, including VISA resources. The term "instrumentation system" is used herein to refer to test and measurement systems as well as process control and modeling systems, among others.

Computer System Block Diagram

Figure 3:
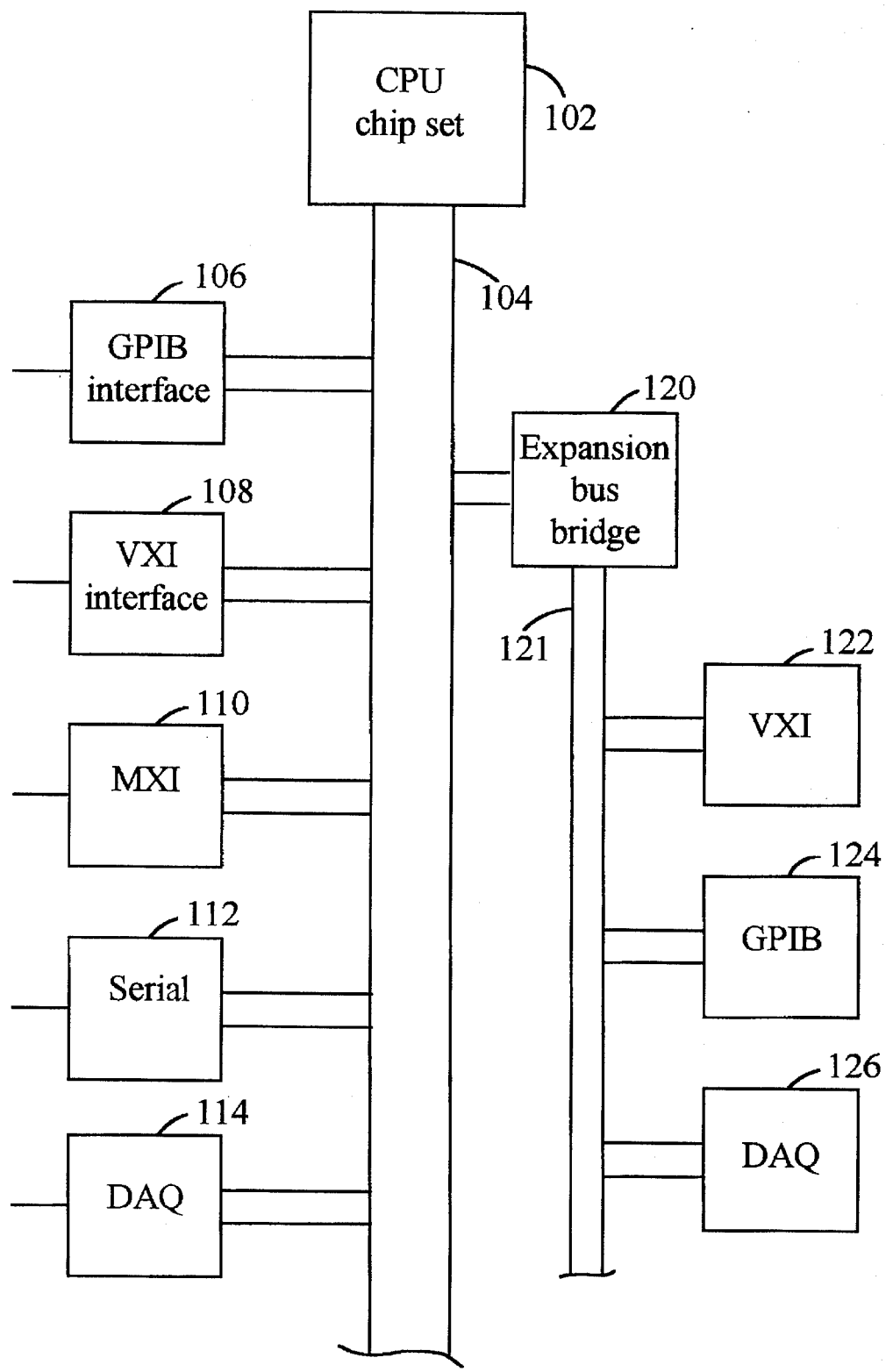
FIG. 3 is a block diagram of a computer system used to control an instrumentation system.

Referring now to FIG. 3, a block diagram of the computer system illustrated in FIGS. 1 and 2 is shown. It is noted that any type of computer system configuration can be used as desired, and FIG. 3 illustrates a representative embodiment. It is also noted that the computer system may be a general purpose computer system as shown in FIGS. 1 and 2, a computer implemented on a VXI card installed in a VXI chassis, or other types of embodiments. As shown, the computer system includes a central processing unit (CPU) 102 which includes a CPU bus 104. The CPU bus 104 is preferably a Peripheral Component Interconnect (PCI) bus, although other types of buses may be used. A GPIB control block 106 connects to the CPU bus 104 and interfaces the CPU 102 to one or more GPIB instruments, as desired. The GPIB control block 106 is preferably the TNT4882 chip produced by National Instruments Corp. A VXI control block 108 couples between the CPU bus 104 and one or more VXI instruments. A MXI interface 110 interfaces the CPU 102 to one or more MXI instruments and a serial interface 112 interfaces to one or more serial instruments. A data acquisition card 114 receives data from a device or unit under test (UUT) and provides this data to the CPU 102. An expansion bus bridge 120 is coupled between the CPU bus 104 and an expansion bus 121. The expansion bus 121 may be any of a number of types, including an AT or ISA (Industry Standard Architecture) bus, MCA (MicroChannel Architecture) bus, EISA (Extended Industry Standard Architecture) bus, NuBus, etc. A VXI interface 122, GPIB interface 124, and DAQ interface 126 are preferably coupled to the expansion bus 121, as shown.

Software Architecture (Prior Art)

Figure 4:
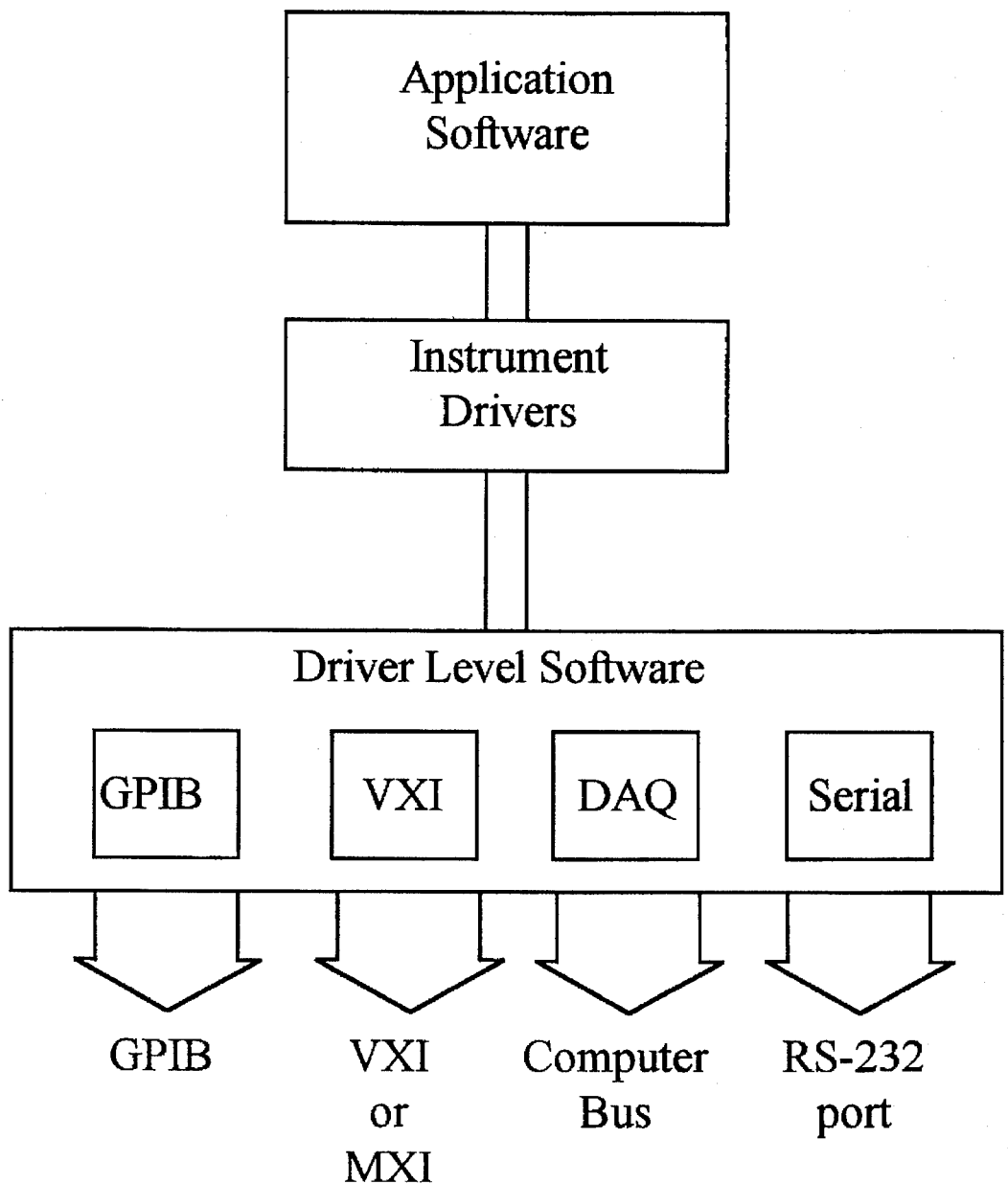
FIG. 4 illustrates the current software architecture for instrumentation systems.

Referring now to FIG. 4, a diagram illustrating a representative software architecture for an instrumentation system is shown. As discussed in the background section, the top level of the software architecture typically comprises an applications program used for high level control of the virtual instrument. The applications programs typically operate in conjunction with one or more instrument drivers to interface to actual physical instruments. The instrument drivers are designed to reduce a user's application development time by providing intuitive high level functions that relieve the user of complex low level instrument programming.

A software level referred to as driver level software or I/O control software is below the instrument driver level. Driver level software is used to interface the commands in the instrument driver to the actual hardware interface being used, such as a GPIB interface card, a data acquisition card, or a VXI card. In other words, driver level software handles the details of communication, i.e., the transfer of commands and data, over a physical connection between the computer and instruments. In general, applications software is developed for a particular type of driver level library.

The computer system implements a system and method according to the present invention which enables applications developed for the NI-VXI driver level library to work properly with a VISA system. The system and method of the present invention maps calls to NI-VXI function commands to VISA operations on VISA resources. The present invention also intelligently performs session management in a VISA system.

VISA Conversion

Figure 5:
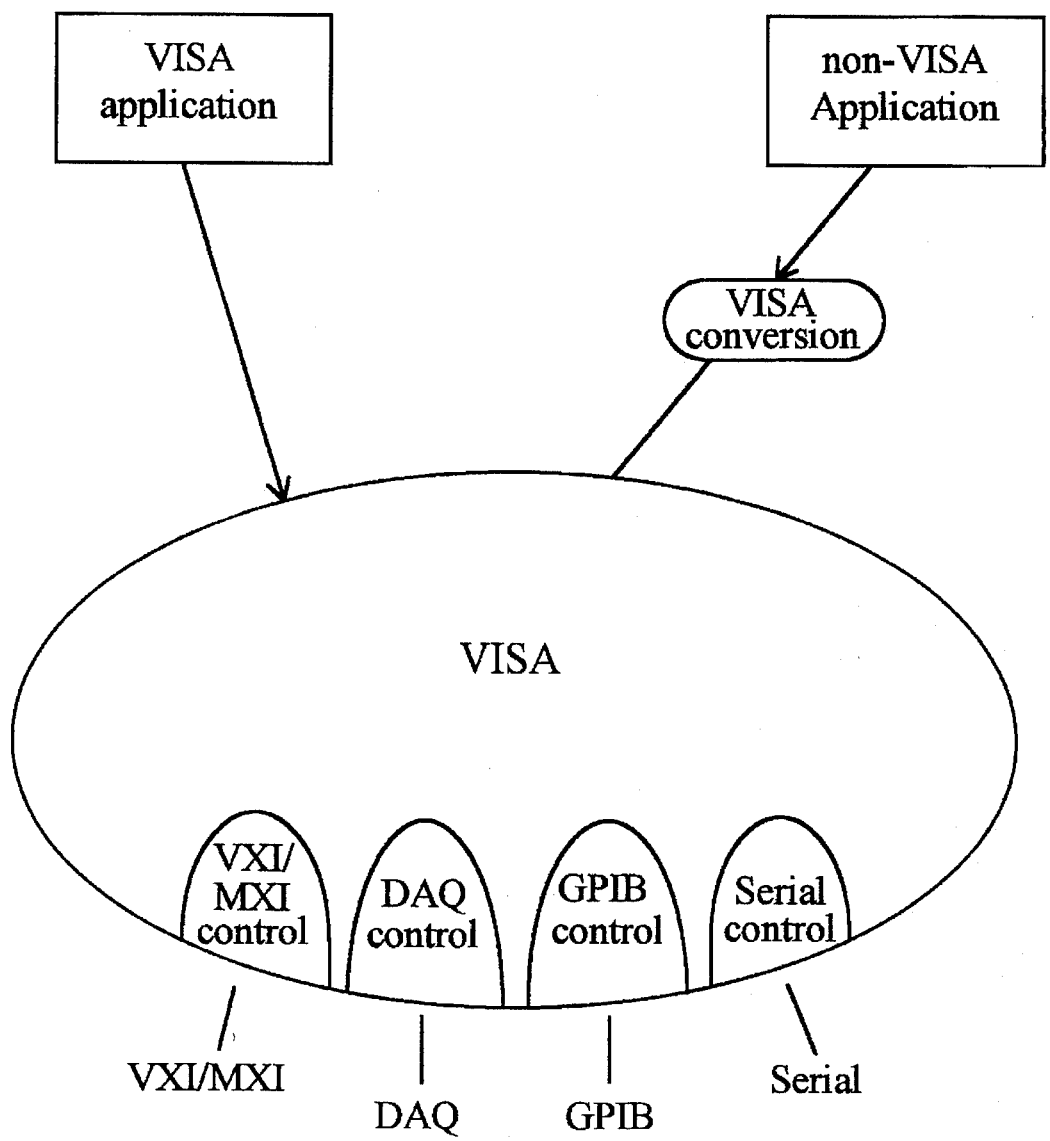
FIG. 5 illustrates the VISA software architecture of the present invention including a VISA conversion block for mapping non-VISA applications to a VISA system

Referring now to FIG. 5, a diagram illustrating the VISA software architecture is shown. As shown, an application created according to the VISA driver level library, referred to as a VISA application, interfaces directly to a VISA system which in turn interfaces directly to hardware. FIG. 5 also illustrates a non-VISA application, i.e., a software application which was not developed according to the method and apparatus of the present invention. A non-VISA application can comprise an application developed to conform to other driver level software standards, including NI-VXI, NI-488, and NI-DAQ from National Instruments Corp., or the Standard Instruments Control Library (SICL) from Hewlett-Packard, among others. A non-VISA application interfaces to a VISA system through a VISA conversion method according to the present invention. As mentioned above, the present invention comprises a system and method for converting calls to NI-VXI function commands to VISA event operations. The NI-VXI to VISA conversion method according to the present invention is described more fully in Appendix 1, and pseudocode for this conversion method is described in Appendix 2.

VISA Background

Background on the Virtual Instrument Software Architecture (VISA), referred to as a VISA system, is deemed appropriate. VISA utilizes a device resource independence model which involves breaking a device down into its individual, nonoverlapping (orthogonal) capabilities. VISA also uses object oriented concepts to simplify the creation of higher level applications. In VISA, the individual capabilities of devices are broken down into a plurality of objects called resources, and these resources are then used to develop instrument drivers or instrument control applications. The device resource independence model and its object oriented nature enable VISA to be independent of I/O interface type, operating system, and programming language. Thus VISA provides a single I/O interface or library which enables a user to control all types of instruments using any of the various types of I/O interfaces.

Due to its object oriented nature, VISA can operate transparently in distributed environments. In other words, the object oriented nature of VISA provides a direct mechanism for the distribution of I/O control software modules across any type of network. Also, the programming model of VISA is the same regardless of the location of a piece of VISA I/O control software and/or the location of the corresponding instrumentation hardware that the software controls. Further, the object oriented nature VISA allows a user to use the objects or resources provided to construct higher level resources, such as instrument drivers and/or applications software, as desired.

In a VISA system, a resource class generally is a definition of a particular capability of a device (such as read, write, trigger, etc.). A resource class is also the specific definition of how to create a resource, i.e., a template for the creation of resources. Each resource can have a set of characteristics called attributes associated with it. For example, an individual GPIB write port resource would have an attribute of End of Transfer Mode (send EOI with the last byte of the transfer) while a VXI interrupt resource would have an attribute of enabled/disabled for reception.

A resource is a particular implementation or instance of a resource class. In general, the term "resource" is synonymous with the connotation of the word "object" in object-oriented architectures. Thus a resource is a particular implementation (or "instance" in object-oriented terms) of a resource class. More particularly, a resource is the particular instance of an instrument control resource class for a specific capability of a specific device in the system (e.g. a GPIB read port of a GPIB device at primary address 5). In a VISA system, every defined software module is a resource, and a resource is defined as the smallest, logical, divisible capability of an instrumentation device controllable through its external connections. For example, a device might have a GPIB port that includes one or more read ports, write ports, status bytes, and so on, and/or the device could have a VXI port that provides control over individual TTL triggers, ECL triggers, VXI interrupt lines, as well as message-level communication. Each of these capabilities is a resource.

Resources fall into one of two general types, these being a basic resource and a compound resource. A basic resource is a wholly contained software module that does not require other resources for operation. A compound resource is a software module that utilizes one or more basic and/or compound resources to provide a higher level of operation.

A resource comprises three elements: a set of attributes associated with the resource, a set of events that are asynchronously received by the resource, and a set of operations that control the resource. For example, a commander read port for a device might have attributes such as end of string character, timeout value, and protocol; one event might be a user abort; the only operation other than basic template operations would be a read operation (with parameters of a buffer and a number of bytes to transfer).

An attribute is a value within a resource which reflects a characteristic of the operational state of the resource. A user's application reads an attribute value to determine the current state of the resource, for example, how the resource is processing an operation, or how the resource should operate when something occurs. A user application sets an attribute to change the way in which the resource operates. For example, if a user's application desires to use a write resource and wants to use a direct memory access (DMA) method, the user's application would set the attribute transfer mode to DMA and then perform the write operation. In this manner, an attribute changes the characteristics in which a resource operates.

An event is an asynchronous occurrence that can arrive independently of normal sequential execution of the process running in a system. Examples of events include, but are not limited to, items such as hardware interrupts, signals, and system messages (i.e., a system failure notification). The events that can occur in a VISA system include local events that are received by only a single resource and global events that can effect more than one resource. In the preferred embodiment, local events are handled by the resource that receives them, and global events are handled by a resource referred to as the VISA Resource Manager resource. In a VISA system, events allow information exchange.

An operation is an action defined by a response that can be performed on a resource, and operations are the primary method of communication among resources and between applications. After a session is established between an application and a resource, the application can communicate with the resource by invoking operations on the resource. Each resource describes the operations which it supports (which are described further below) and the resource and the application exchange information through the parameters of the operations.

A session is a term used to designate a communication channel between a user's application and a resource. In other words, a session is a communication channel that binds an application and a resource. In essence, a session is an instance of a resource, much the same way a resource is an instance of a resource class. Resources can have multiple sessions open to them. In addition, a resource can control one or more other resources.

VISA includes a grouping of resource classes referred to as the instrument control resource classes for controlling GPIB, VXI, and serial instruments as well as data acquisition boards. The instrument control resource classes can be logically partitioned into common resource classes and device-specific resource classes. Common resource classes are those class definitions that have some commonality with one or more types of devices (e.g. both GPIB and VXI or both VXI and a trigger board) or that can be defined in a manner such that the resource class is independent of the device with which it is communicating (e.g. formatted I/O). Specific physical device resource classes (also called hardware-specific classes) are those resource classes that have no commonality with other types of resource classes and are used to control device and/or interface level features specifically for a single type of device.

An object referred to as "ViObject" is the most basic object in a VISA system. ViObject supports attributes and closing.

A resource referred to as the VISA Resource Template inherits from ViObjects and defines an interface including a well-defined set of services that are used by all resources, i.e., each VISA resource derives its interface from the VISA Resource Template. The VISA Resource Template defines a set of control services including location and searching, life cycle control, characteristic control, and access control. The location and search services include services for finding a resource in order to establish a communication link to the resource. The location and search service uses an operation referred to as viFindRsrc. The life cycle control services include the creation and deletion of sessions or links to resources and include operations referred to as viOpen, viClose, viAttachRsrc, viDetachRsrc, and viTerminate. The characteristic control services include operations which manipulate attributes to set and retrieve the status of resources, including operations referred to as viSetAttribute, viSetRsrcAttribute, viGetAttribute, and viGetRsrcAttribute. The access control services are used to control the types of accesses that can be made to resources, including operations referred to as viLock(), viLockRsrc(), viUnlock(), and viUnlockRsrc().

The VISA Resource Template also defines various communications services among resources and between applications and resources. The two methods of communication among resources and between applications are operation invocation, i.e., invoking operations on a resource, and the exchange of information through events. After establishing a session to a resource, an application can communicate with the resource by invoking operations on the resource. These operations include the operations defined in the VISA Resource Template described above as well as the operations supported by the particular resource. The resource and application exchange information through the parameters of the operations. The VISA Resource Template also defines event reporting, including callbacks, queuing, and waiting services for resources during system events, exceptions, and resource defined events.

The VISA Resource Manager derives its interface from the VISA Resource Template and is responsible for managing, controlling, and distributing resources within the system, including the instrument control resources. The VISA Resource Manager shields resource implementations from having to know about most details of resource management and distribution of instrument control resources within a system.

Applications use the VISA Resource Manager to create sessions with particular resources within a system. The VISA Resource Manager presents a common interface to all instrument control resources in the system regardless of their physical location. The VISA Resource Manager includes the following responsibilities: registration of resources (from the system point of view), un-registration of resources, locating resources (location search), management of session creation, modification and retrieval of resource attributes, operation invocation, event reporting, and access control, among others. The VISA Resource Manager includes an API for these management needs, and all defined resources may use these capabilities.

The VISA Resource Manager allows a user to open a session to any resource in the system, including only single device capabilities such as a single trigger line or single write port on a device. In one embodiment of the invention, the instrument control resources include a resource referred to as the VISA Instrument Control Organizer Resource (VICO) which allows for the creation of user-defined resource groupings (virtual instruments) of the instrument control resources. A virtual instrument, in this context, is a name given to a unique session to a resource to provide the functionality of a traditional, stand-alone instrument. VICO is included in this embodiment to provide a higher level user interface so that users can communicate with instrumentation at a higher level of abstraction. VICO is a resource similar to other resources in the system, but is unique, however, in the sense that it serves only one unique service specifically for the instrument control resources. Thus VICO encapsulates features of the resources for users who require a simple interface.

At startup of the VISA system, a method is invoked which configures the instrumentation system. This method involves determining the respective hardware and instruments available within the system as well as determining the logical address of the respective instruments in this system. The method determines the classes available within the system and uses the determined classes and the hardware configuration to create or instantiate resources. These newly created resources are then registered with the VISA Resource Manager so that the VISA Resource Manager is aware of their presence. The registration process comprises providing entry points of the resource to the VISA Resource Manager, including a description of the operations, a description of the attributes, a description of the exit conditions, the location of the files, and a description of the files themselves. Due to the hierarchical nature in which some resources use other resources for their operation, the instantiation and registration process may require the creation and instantiation of other resources.

Once a plurality of resources have been created and registered with the VISA Resource Manager, these resources can be used to create instrument control applications. In the present disclosure, the user of a VISA system can either be a client or developer. A client uses the resources in a VISA system to create applications, such as instruments drivers, that are not themselves resources. A developer, on the other hand, uses resources as a client or incorporates functionality from the resources available in a VISA system to create higher level applications that are resources. A developer can create a higher level resource that uses other resources, much the same way that a client uses resources, or the developer can create a higher level resource that incorporates functionality from one or more resources. As an example of a higher level resource, a developer can develop a resource that embodies all of the functionality of a type of instrument, such as a voltmeter. This resource can then be used to control any type of voltmeter using any type of I/O interface.

When VISA is implemented in the C++ programming language, a resource class is preferably implemented as a C++ class. A resource instance or resource is implemented in C++ as an instance of the class. A session is preferably implemented by creating a data structure that mirrors the resource instance and also includes references to local data that is local to the session. This involves allocating memory for a new structure, creating a mirror of the resource and providing the session with a reference to local data that is local to the session.

VISA System

Figure 6:
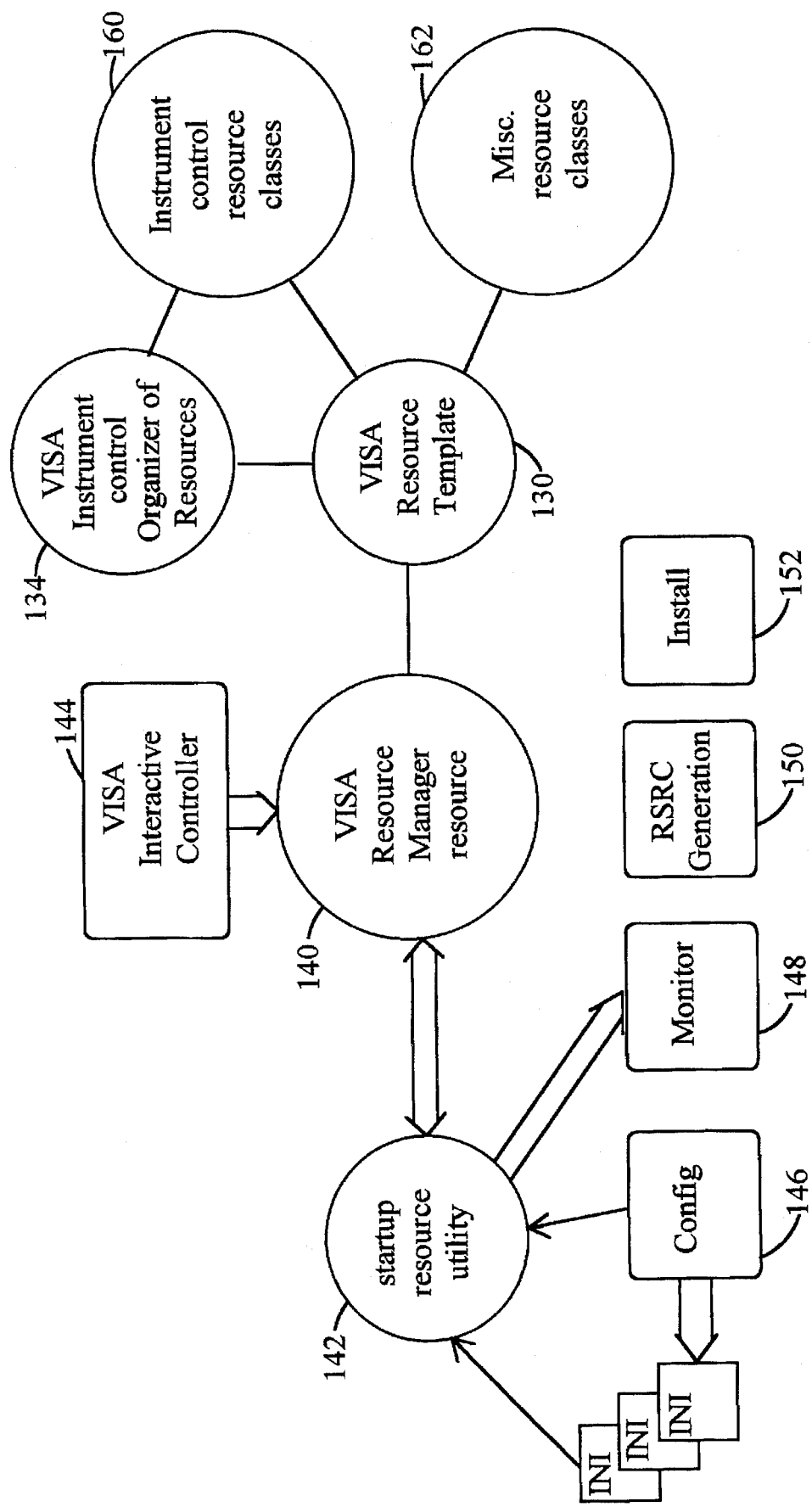
FIG. 6 illustrates the components of a VISA system according to the present invention.

Referring now to FIG. 6, the various elements comprising a VISA system are shown, including various utilities for installation and configuration. As shown, a VISA system includes a VISA Resource Template 130, a VISA Resource Manager resource 140, which acts as the primary or runtime resource manager, a startup resource utility 142, a VISA interactive controller 144, a configuration utility 146, a monitor utility 148, a resource generation utility 150, and an install utility 152. In addition, a VISA instrumentation system includes a plurality of instrument control resource classes 160 as well as other resource classes 162, as desired, which preferably incorporate their interface from the VISA Resource Template 130. A VISA system may further include a VISA Instrument Control Organizer (VICO) resource 134 that incorporates its interface from the VISA Resource Template 130 and can be used to control the instrument control resource classes 160.

The instrument control resources 160 and other resources 162 act as building blocks for user applications. In the present disclosure the term "user" is intended to include a client which uses the available resources to create client applications as well as a developer who either uses or incorporates the available resources to develop new, possibly higher level, resources. It is noted that a VISA system can include one or more additional runtime resource managers as well as additional groupings of resource classes for additional functionality, as desired.

The VISA Resource Template 130 is essentially a base class from which all new resources derive their interface. Each resource in a VISA system includes a set of basic capabilities, i.e., basic attributes, operations and events. The VISA Resource Template 130 allows a developer of new resources to reuse these basic capabilities which each resource requires.

In one embodiment of the invention, a VISA system includes a VISA Resource Metaclass (not shown) which defines the default manner in which resource classes are defined in a VISA system. In other words, the VISA Resource Metaclass defines the standard way in which resources are instantiated and destroyed.

The VISA Resource Manager 140 is responsible for managing, controlling, and distributing resources within the system, including instrument control resources. Applications use the VISA Resource Manager 140 to create sessions with particular resources within a system. In the present application, a session is defined as a communication channel with a resource within the system and a session designates a reference to an individual resource being controlled. The VISA Resource Manager 140 presents a common interface to all instrument control resources in the system regardless of their physical location. The VISA Resource Manager 140 includes the following responsibilities: creation and deletion of resources, finding resources (location search), session creation, modification and retrieval of individual resource attributes, operation invocation, event reporting, and concurrency control (locking), among others. The VISA Resource Manager 140 includes an API for these management needs and all defined resources may use these capabilities. The VISA Resource Manager 140 shields resource implementations from needing to know about most details of resource management and distribution of instrument control resources within a system. The VISA Resource Manager 140 is the runtime resource manager. In contrast, the startup resource utility 142 is invoked at startup and its function is to register the resources in the system with the VISA Resource Manager 140. The various operations, attributes, and events of the VISA Resource Manager resource 140 are discussed further below.

In the preferred embodiment, the instrument control resource classes 160 comprise resource classes for controlling GPIB, VXI, and serial instruments, as well as data acquisition (DAQ) boards. The instrument control resource classes can be logically partitioned into common resource classes and device-specific or interface-specific resource classes. Common resource classes are those class definitions that have some commonality with one or more types of devices (e.g. both GPIB and VXI or both VXI and a trigger board) or that can be defined in a manner such that the resource class is independent of the device or interface with which it is communicating (e.g. formatted I/O). Device-specific or interface-specific instrument control resource classes (also called hardware-specific resource classes) are those resource classes that have no commonality with other types of resource classes and are used to control specific devices and/or interface level features because the capabilities of the bus or connection to the device cannot be separated from the individual device. An example is the Interface clear line on the GPIB bus, which is a line that is bussed across the entire GPIB bus and thus affect other devices. The resource classes 162 may comprise classes for process control, among others.

As discussed above, a session is a term used to designate a communication channel between a user's application and a resource. A function call or operation on the VISA Resource Manager 140 referred to as viOpen instructs the VISA Resource Manager 140 to create a session between a resource and a user's application, which may also be a resource. In many instances it is desirable for more than one application to be able to control an instrument. In these instances it is necessary to have more than one communication channel to the respective resource that controls the respective capability of the instrument. The session is the mechanism used to project the interface for a resource out to the user application. Thus, a session is a communication channel that binds an application and a resource. In essence, a session is an instance of a resource, much the same way a resource is an instance of a resource class. Resources can have multiple sessions open to them. In addition, a resource can control one or more other resources. The VISA Resource Manager 140 allows a user to open a session to any resource in the system, including single device capabilities such as a single trigger line or a single write port on a device.

A VISA system can include a resource referred to as the VISA Instrument Control Organizer (VICO) 134 which allows for the creation of user-defined resource groupings (virtual instruments). A virtual instrument, in this context, refers to a unique session to a resource to provide the functionality of a traditional, stand-alone instrument. The VICO 134 is included in this embodiment to provide a higher level user interface so that users can communicate with instrumentation at a higher level of abstraction. The VICO 134 is a resource similar to other resources in the system. VICO 134 is unique, however, in the sense that it serves only one unique service specifically for instrument control resources. With VICO 134, applications can create sessions that can communicate with any number and type of Instrument control resources. In other words, a single VICO session can control all aspects of one or more complete devices. Thus VICO 134 encapsulates features of the resources for users who require a simple interface.

The startup resource utility 142 registers and unregisters resources with the VISA Resource Manager 140 at startup, monitors VISA Resource Manager events, and provides the capability to monitor resources and events. The resource monitor utility 148 monitors the resources that are registered to the VISA Resource Manager 140 and also monitors active instantiations of resources to the VISA Resource Manager 140. The resource monitor 148 also monitors for specific events occurring in the VISA Resource Manager 140, and maintains a log or history of user specified VISA actions. The configuration utility 146 operates to modify default attributes for resources as directed by a user, as well as modify hardware information needed by the resource to find the hardware. The configuration utility 146 also notifies the resource manager of new resources in the system, creates aliases for groupings of resources, and informs the resource manager of these aliases.

The VISA interactive control utility 144 interactively and dynamically finds resources and executes methods of those resources. The VISA interactive control utility 144 also simulates VISA actions/events. It is noted that the capabilities of this utility are derived from the VISA application programming interface. The resource generation utility generates a resource usable by the configuration utility and the resource manager utility from a user defined set of entry points and structures. The Install utility 152 provides a common look and feel to installation of components within the VISA system.

Example VISA System

Figure 7:
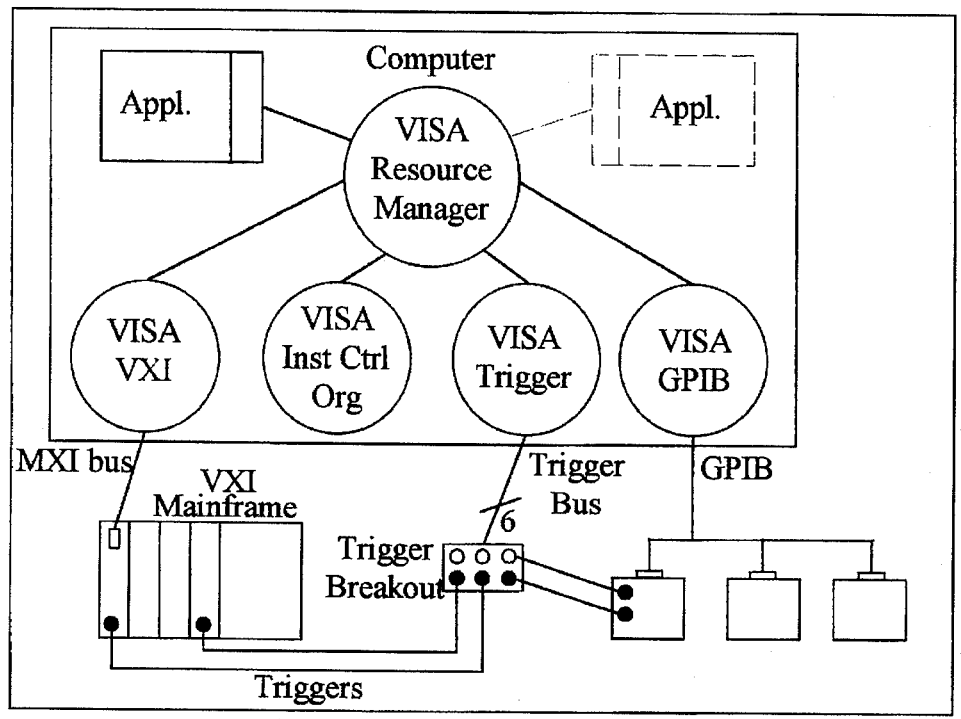
FIGS. 7 and 8 illustrate two examples of a VISA instrumentation system in a non-distributed and distributed environment, respectively.
Figure 8:
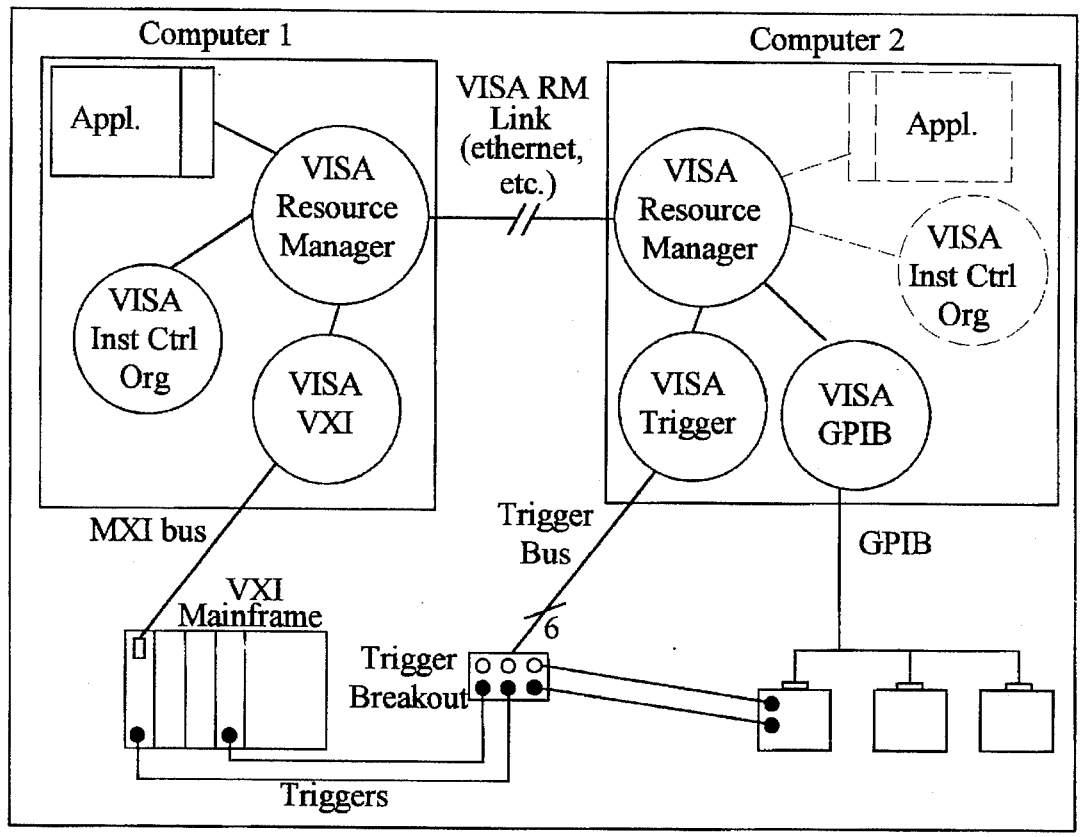

Referring now to FIGS. 7 and 8, block diagrams illustrating various embodiments of a VISA system are disclosed. FIG. 7 shows a VISA system where one or more applications control various resources, such as a VXI resource, a trigger resource, and a GPIB resource through the VISA Resource Manager 140. The applications also use the VICO 134 to aid in the creation and use of these resources. As shown, the VXI resource controls the VXI mainframe through an MXI bus. The trigger resource controls a trigger breakout device through a trigger bus and the GPIB resource controls one or more GPIB instruments through the GPIB bus.

FIG. 8 illustrates an embodiment of a VISA system in a distributed environment. As discussed further below, the device resource independent and object oriented nature of VISA allows the system to be readily adapted to distributed environments. FIG. 8 illustrates an embodiment where two or more computers in different physical locations are used to control a single instrumentation system. As shown, computer 1 includes an application which controls one or more resources. The application controls a VXI resource and VICO 134 through the VISA Resource Manager 140. Computer 2 includes an application that also controls one or more resources through a second VISA Resource Manager 140, in this example, a trigger resource and a GPIB resource, as well as VICO 134. Computer 1 communicates with computer 2 through a VISA Resource Manager link such as a network connection such as Ethernet. As shown in Computer 2, the dashed lines around VICO 134 and the application indicate that the application and VICO 134 are not necessary in computer 2, and the application in conjunction with the VISA Resource Manager 140 in computer 1 can control all of the resources and the VISA Resource Manager 140 in computer 2, as desired.

VISA Resource Manager

As discussed above, the VISA Resource Manager 140 is a runtime resource manager that controls resources in a VISA system. The VISA Resource Manager 140 is also itself a resource, and includes attributes, operations and events like any other resource. The VISA Resource Manager 140 provides the mechanisms in a VISA system to control and manage resources. This includes but is not limited to the assignment of unique resource addresses, unique resources ID's, operation invocation, and event management. The VISA Resource Manager resource 140 is a resource like all other resources in the system and it derives its interface from the VISA Resource Template 130, but does not expand upon this interface. The VISA Resource Manager resource 140 provides connectivity to all of the VISA resources registered with it. The VISA Resource Manager 140 gives applications control and access to individual resources and provides the services described below. The VISA Resource Manager 140 utilizes the resources available to it to service requests from the applications and other resources requiring service of a given resource.

The VISA Resource Manager 140 provides access to all of the resources that are registered with it. The VISA Resource Manager 140 is therefore at the root of a subsystem of connected resources. There could be more than one root level resource manager resource in a complete VISA system, and each descendent could itself act as a resource manager of its own. Each of these resource managers has the capability to cover multiple host computers and can be a distributed entity over the network on which the subsystem is being implemented An application can use the VISA Resource Manager 140 as a monitoring point for a particular subsystem by enabling the generation of events on the system defined events, which include the notification of resources or sessions being killed or becoming inactive. Resource level control of attributes allows an application to set and retrieve global attributes without having to open a session to this resource.

The VISA Resource Manager 140 handles all system events that occur in a VISA system, and the attributes comprised within the VISA Resource Manager resource 140 comprise global attributes about the version of the system and the characteristics of the system. The majority of operations that are included within the VISA Resource Manager resource 140 and which can be used to act upon the VISA Resource Manager 140, such as get and set attribute, generate event, etc. are also on the majority of instrument control resources 160 and miscellaneous resources 162. Thus, the VISA Resource Manager 140 follows the resource model of the resources it controls, i.e., the resource manager follows its own constraints. For example, in one embodiment of a VISA system, an additional resource is provided which acts in a similar manner to the VISA Resource Manager 140. This resource is used to control subnetworks of resources, with the VISA Resource Manager 140 managing the created resource which acts similarly to the VISA Resource Manager 140.

Figure 9:
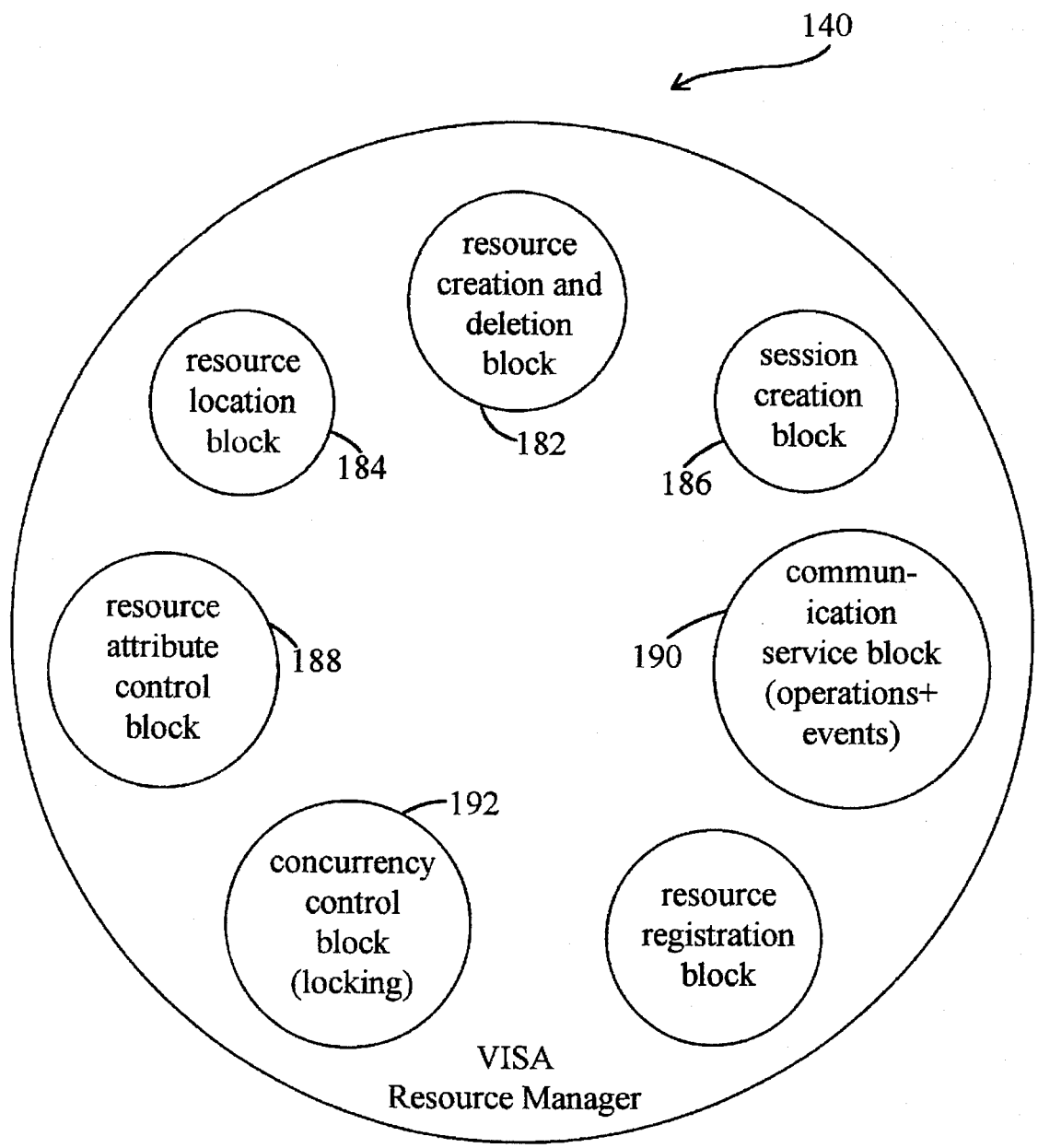
FIG. 9 illustrates the components of the VISA Resource Manager.

Referring now to FIG. 9, a diagram illustrating the various components which comprise the VISA Resource Manager 140 is shown. As shown, the VISA Resource Manager 140 includes a resource creation and deletion block 182, a resource location block 184, a session creation block 186, a resource attribute control block 198, a communication service block 190, a concurrency control block 192, and a miscellaneous function block 194. These blocks comprised within the VISA Resource Manager 140 provide basic resource control and communication services to applications.

The resource creation and deletion block 182 is involved with creating and deleting resources. The resource location block 184 finds a resource in order to establish a communication link to the resource. This search is based on a unique symbolic name. The session creation block 186, also referred to as the life cycle control block, controls the life cycle of sessions to resources established by the requests of applications, i.e., this block creates and deletes sessions to a resource.

The resource attribute control block 188 includes attribute manipulation operations to set and retrieve the status of resources. This block also performs the initialization or setup of resource attributes while creating sessions to respective resources. The operation in the VISA Resource Manager 140 for modifying attributes is viSetAttribute() and the operation in the VISA Resource Manager 140 that retrieves the value of an attribute is viGetAttribute(). The resource attribute control block 188 also allows applications to set up access modes to resources.

The communication service block 190 manages sessions between applications and resources. The primary method of communication among resources and between applications and resources is referred to as operation invocation, i.e., invoking an operation on the respective resource to direct the resource to perform the desired function. The communication service block 190 also allows the exchange of information through events Operation Invocation refers to communication between an application and a resource using operations defined in the resource. After establishing a session to a resource, an application can communicate with the resource by invoking operations on the resources. Each resource describes the operations supported by the resource and the resource and application exchange information through the parameters of the operations.

As discussed above, in a VISA system an event is defined as an asynchronous occurrence which can be generated either in hardware or in software. The communication service block 190 in VISA Resource Manager traps all the system events that require system-wide action. The system events can be generated either by resources or by other external occurrences. These events are then reported back to the application. An application can be notified on occurrence of an event by two different mechanisms. In case of exceptions, the events are reported back only to the application thread causing the exception.

Resource Classes

Figure 10:
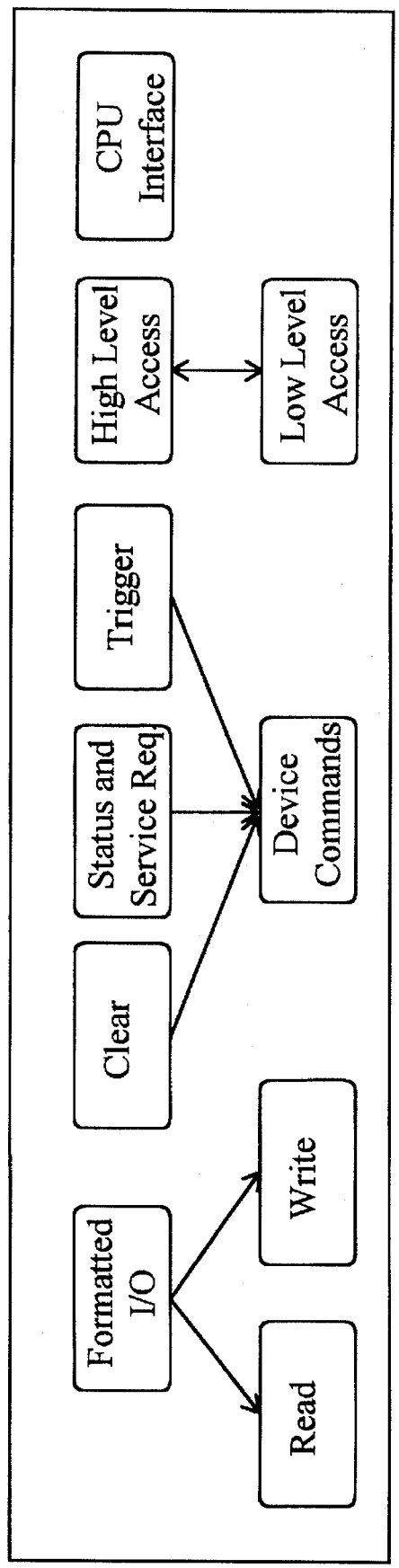
FIG. 10 illustrates the common instrument control resource classes.
Figure 11:
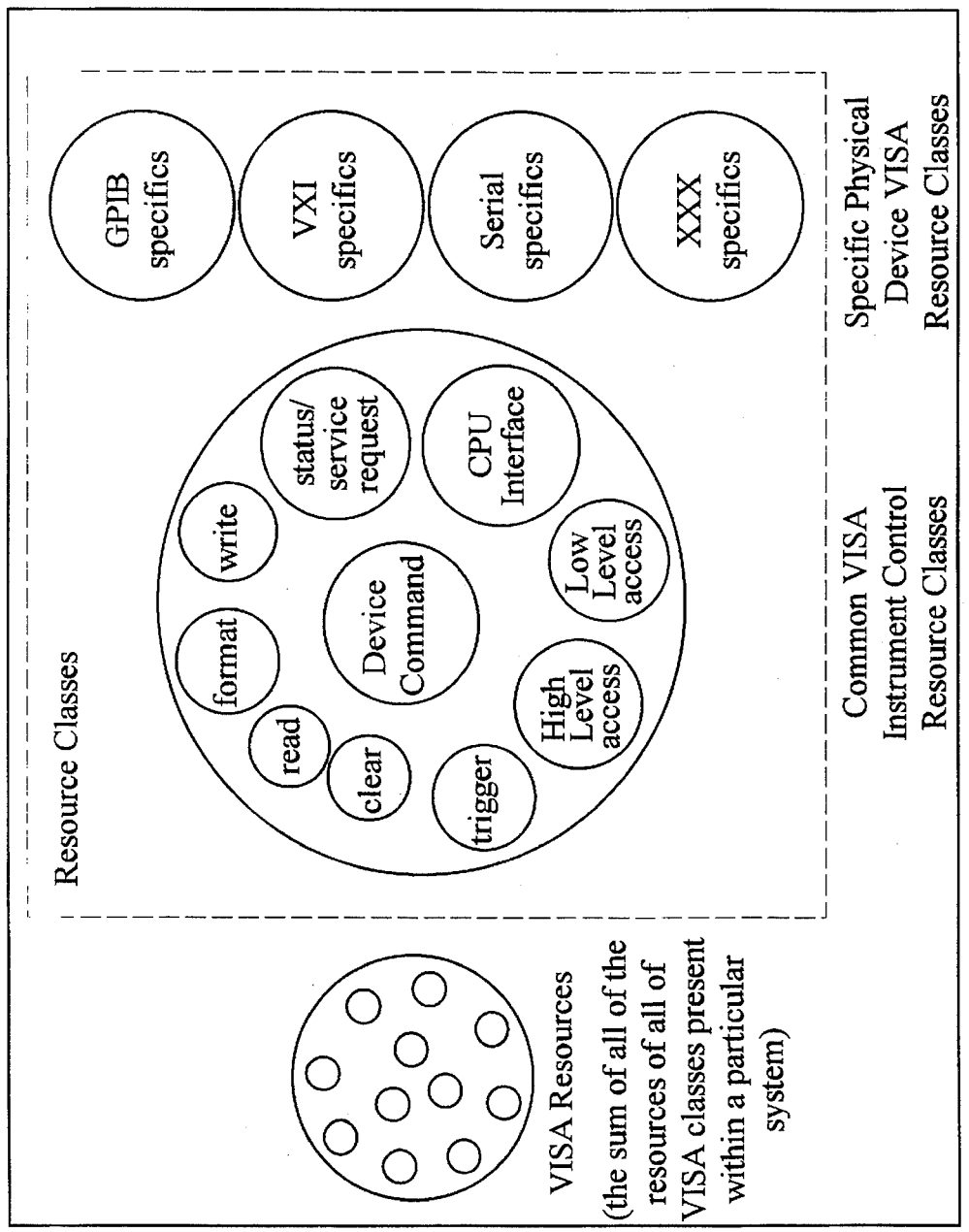
FIG. 11 illustrates the common instrument control resource classes and specific physical device VISA resource classes and corresponding VISA resources.
Figure 12:
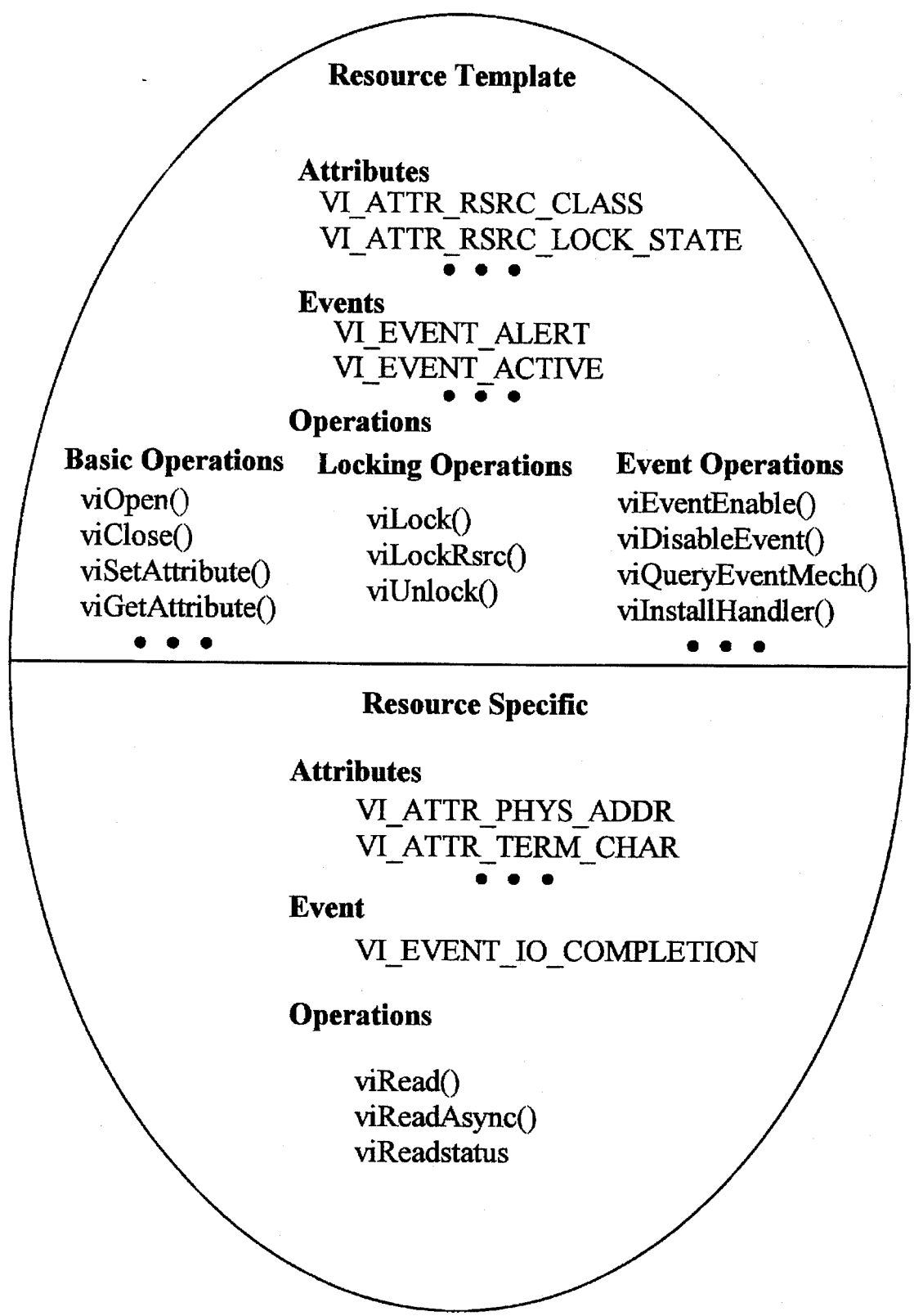
FIG. 12 illustrates the organization of an instrument control resource class.

FIGS. 10 and 11 illustrate the resource classes comprised in the instrument resource classes block 160. The instrument control resource classes 160 are provided to encapsulate the various operations of a device, including reading, writing, trigger, and so on. A VISA instrument control resource, like any other resource, is defined by the basic operations, attributes, and events of the VISA Resource Template 130. For example, modifying the state of an attribute is performed via the operation viSetAttribute(), which is defined in the VISA Resource Template 130. Although the instrument control resource classes 160 do not have viSetAttribute() listed in their operations, they provide this operation because it is defined in the VISA Resource Template. Likewise, the instrument control resource classes 160 provide all of the operations included in the VISA Resource Template 130 because they are defined in the VISA Resource Template 130. As shown in FIG. 12, from the basic interface of the VISA Resource Template, i.e., this basic set of attributes, events, and operations, each resource class adds its specific operations, attributes and events, which allow the class to act as a template for resources which perform the dedicated task of the class, such as sending a string to a message-based device.

FIG. 11 illustrates the instrument control resource classes comprised in a VISA system. FIG. 11 also shows that the sum of all the VISA instrument control resource classes is comprised of the common instrument control resource classes and the specific device (interface or hardware specific) instrument control resource classes.

FIG. 10 illustrates the common resource classes, these being: Formatted I/O, Read, Write, Clear, Status and Service Request, Trigger, Device Commands, High Level Access, Low Level Access, and CPU Interface. FIG. 10 also shows the hierarchy or relationship of the common instrument control classes. As shown, the Formatted I/O resource class relies on the Read and Write resource classes for its operation. Thus, when a resource from the Formatted I/O resource class is instantiated, the resource opens sessions to the appropriate Read and Write resources. Likewise, the Clear, Status and Service Request, and Trigger resource classes rely on the Device Commands resource class for their operation. The High Level Access resource class relies on the Low Level Access resource class for its operation. Some resources, such as the CPU Interface resource, have no inter-relation with any other instrument control resource. This does not imply that the resource cannot be used with the other resources, but that it does not use, and is not used by, any other instrument control resource.

FIG. 11 illustrates the manner in which the instrument control resource classes include the common instrument control resource classes and the specific physical device instrument control resource classes. As shown, the specific physical device resource classes include GPIB specific, VXI specific, and serial specific resource classes.

The instrument control resource classes are discussed in detail in Appendix 1 of U.S. patent application Ser. No. 08/238,480, previously referenced and incorporated by reference herein in its entirety. As shown in Appendix 1 of the patent application referenced above, each of the instrument control resource classes include a number of attributes, operations, and events for implementing respective capabilities of instruments.

These instrument control resource classes in a VISA system, including the common resource classes and the hardware specific resource classes, are also listed below.

| Resource Class | Abbr. Name | Standard Name |
| --- | --- | --- |
| VISA Resource Manager Resource | VRM | VI_RSRC_VISA_RM |
| VISA Instrument Control Organizer | VICO | VI_RSRC_VISA_IC_ORG |
| Write Resource | WR | VI_RSRC_WR |
| Read Resource | RD | VI_RSRC_RD |
| Formatted I/O Resource | FIO | VI_RSRC_FMT_IO |
| Trigger Resource | TRIG | VI_RSRC_TRIG |
| Clear Resource | CLR | VI_RSRC_CLR |
| Status/Service Request Resource | SRQ | VI_RSRC_SRQ |
| High Level Access Resource | HLA | VI_RSRC_HL_ACC |
| Low Level Access Resource | LOLA | VI_RSRC_LL_ACC |
| Device Specific Commands Resource | DEVC | VI_RSRC_DEV_CMD |
| CPU Interface Resource | CPUI | VI_RSRC_CPU_INTF |
| GPIB Bus Interface Control Resource | GBIC | VI_RSRC_GPIB_INTF |
| VXIbus Device Configuration Resource | VXDC | VI_RSRC_VXI_DEV_CONF |
| VXIbus Interface Control Resource | VXIC | VI_RSRC_VXI_INTF |
| VXIbus Slot 0 Resource | VXS0 | VI_RSRC_VXI_SLOT_0 |
| VXIbus System interrupts Resource | VXSI | VI_RSRC_VXI_SYS_INTR |
| VXIbus Signal Processor Resource | VXSP | VI_RSRC_VXI_SIG_PROCESSOR |
| VXIbus Signal Resource | VXS | VI_RSRC_VXI_SIG |
| VXIbus Interrupt Resource | VXIN | VI_RSRC_VXI_INTR |
| VXIbus Extender Interface Resource | VXEI | VI_RSRC_VXI_EXTDR |
| Asynchronous Serial Bus Interface Control Resource | ASIC | VI_RSRC_ASRL_INTF |

Referring again to FIG. 12, a diagram illustrating the organization of one of the instrument control resources 160 is shown. As previously noted, each resource within a VISA system, including the instrument control resources 160, derive functionality from the VISA Resource Template 130. FIG. 12 illustrates the manner in which each instrument control resource 160 includes a portion (upper portion) that derives its interface from the VISA Resource Template 130 and a portion (lower portion) that comprises an interface that is specific to that particular resource.

Figure 13:
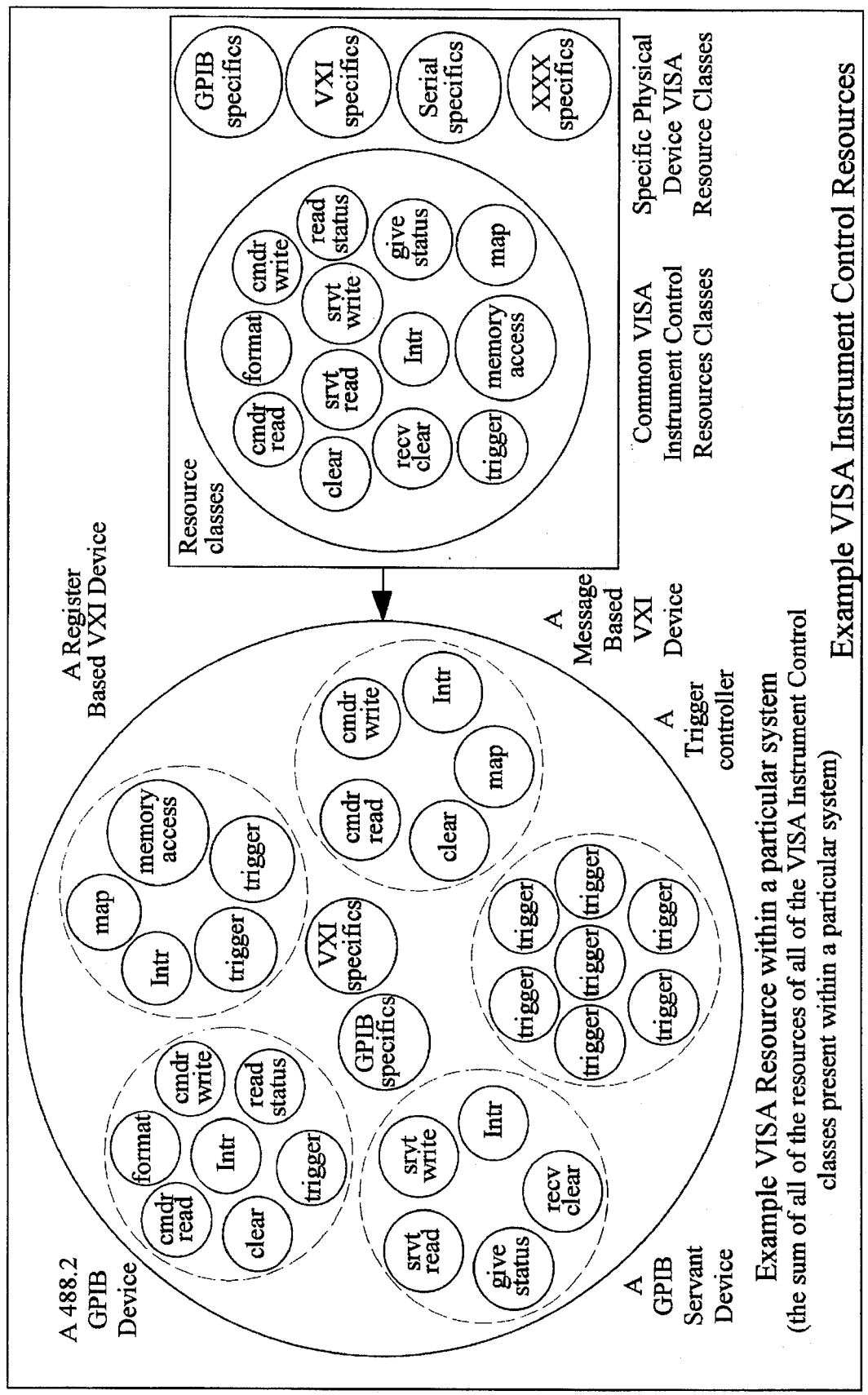
FIG. 13 illustrates example VISA instrument control resources.

FIG. 13 shows an example of the resources that might be created when a system has been powered up and in use. The resources in this example are based loosely on the example configuration shown in FIGS. 7 and 8. In this example, resources are created for the VXI system, the GPIB system, and the trigger controller. It is noted that only the device capabilities that each device has are reflected in the set of resources in the system. It is also noted that the medium size circles are provided around groupings of resources simply as a visual grouping organization, and these circles are not intended to connote any meaning regarding system operation or usage of resources. From the standpoint of the VISA Resource Manager, each resource in the system is treated exactly the same.

A resource class referred to as INSTR is an abstraction which includes different resources for different types of instruments. For example, an INSTR resource for a register-based device only includes High Level and Low Level Access resources, while an INSTR resource for a GPIB device has Read, Write, Trigger, Poll and Clear resources. An INSTR resource for a message-based device includes Read, Write, Trigger, Poll and Clear resources in addition to High Level and Low Level Access resources.

VISA System Operation

Figure 14:
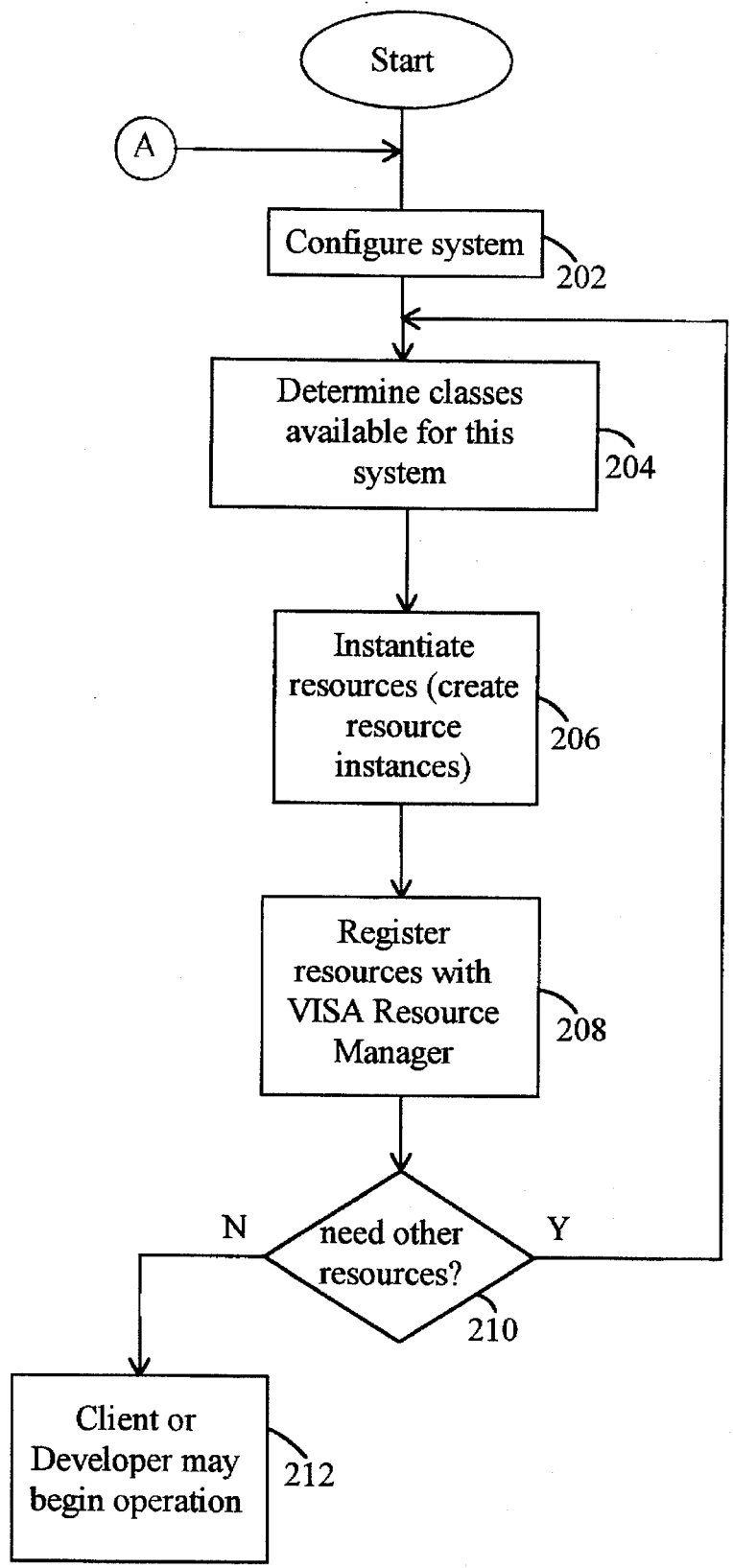
FIG. 14 is a flowchart diagram illustrating the configuration steps performed by a VISA system.
Figures 15, 16:
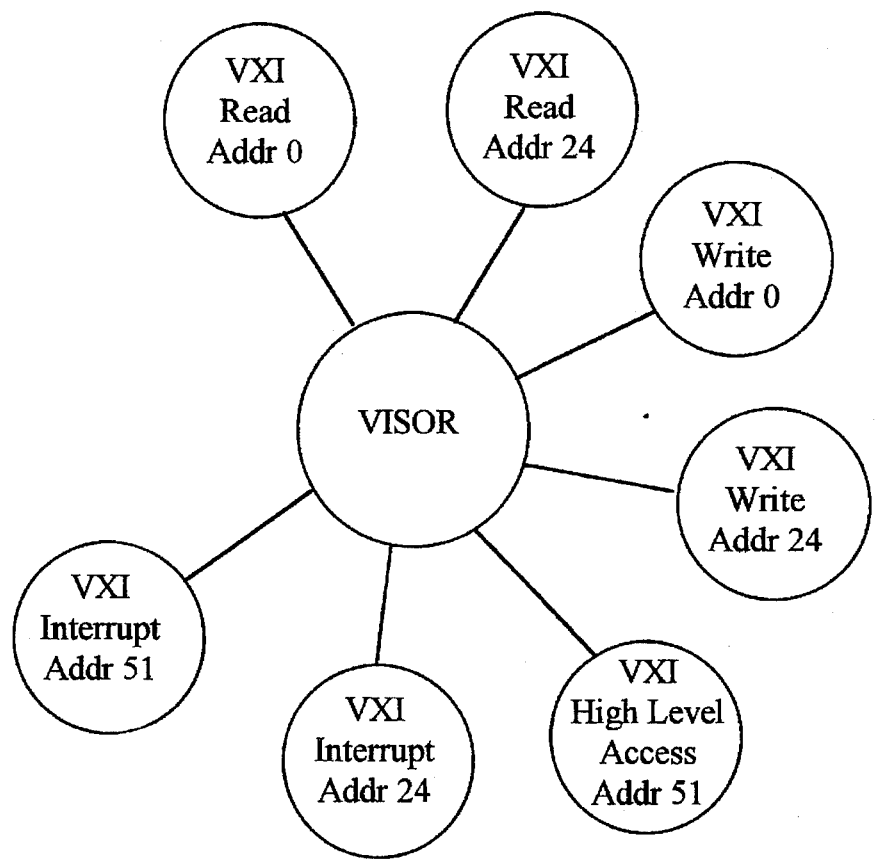
FIG. 15 illustrates an example of instrument devices and resource classes implemented in an example VISA system.
FIG. 16 illustrates the resources created by the configuration method of FIG. 14 for the example VISA system of FIG. 15.

Referring now to FIG. 14, a diagram illustrating operation of the present invention at power up is shown. This operation is described in conjunction with a simple instrumentation system which is shown in FIGS. 15 and 16. As shown in FIG. 15, the example instrumentation system includes a VXI chassis including a CPU card, a message based device card and a register based device card. The CPU card has an address of 0, the message based device has an address of 24, and the register based device has an address of 51. The resource classes available in this example are Read, Write, High Level Access, and VXIbus Interrupt.

Referring again to FIG. 14, in step 202 a method is invoked which configures the instrumentation system. This method involves determining the respective hardware and instruments available within the system as well as determining the logical address of the respective instruments in this system. In the present example, in step 202 the method would determine that there is a VXI CPU card having address 0, a respective message based device having an address of 24, and a respective VXI register based device having an address of 51 comprised within the system. In step 204 the method determines the classes available within the system. In the present example, the method would determine that the classes available are Read, Write, High Level Access, and Interrupt. In step 206 the method uses the classes determined in step 204 and the hardware configuration determined in step 202 to create resources.

Referring now to FIG. 16, a diagram illustrating the resources that are generated in this example are shown. As shown, the resources created include a VXI Read of address 0, a VXI Read of address 24, a VXI Write of address 0, a VXI Write of address 24, a High Level Access at address 51, a VXI Interrupt at address 51, and a VXI Interrupt at address 24. The startup resource utility 142 instantiates or creates these resources in step 206. The step of instantiating or creating resources in step 206 involves creating an instance which includes code that is inherited or incorporated from the class determined in step 204. The example shown in FIG. 15 includes a read resource class. In order to create an instance of that class, for example a VXI read instance, the method creates an instance which inherits from the interface of the read class. The method may also overwrite a portion of this inherited code with new code that actually implements the specific reads for the interface, in this example the VXI interface.

In step 208 the startup resource manager registers these resources with the VISA Resource Manager 140. In other words, the application programming interface of the resource is provided to the VISA Resource Manager 140, and the resource is provided with a unique name or identifier. The registration process comprises providing entry points regarding the resource, including a description of the operations, a description of the attributes, a description of the exit conditions, the location of the files, and a description of the files themselves.

Upon completion of step 208, the method determines in step 210 if other resources are needed to register the resources in step 208 that were created in step 206. Due to the hierarchical nature in which some resources require other resources for operation as discussed above with regard to FIG. 22, it may be necessary for other resources to be created and registered with the VISA Resource Manager 140. If other resources are determined to be necessary in step 210, then operation returns to step 204. If other resources are not required in step 210, then startup operation has completed and operation is turned over to the user.

viOpen Operation

Figure 17A:
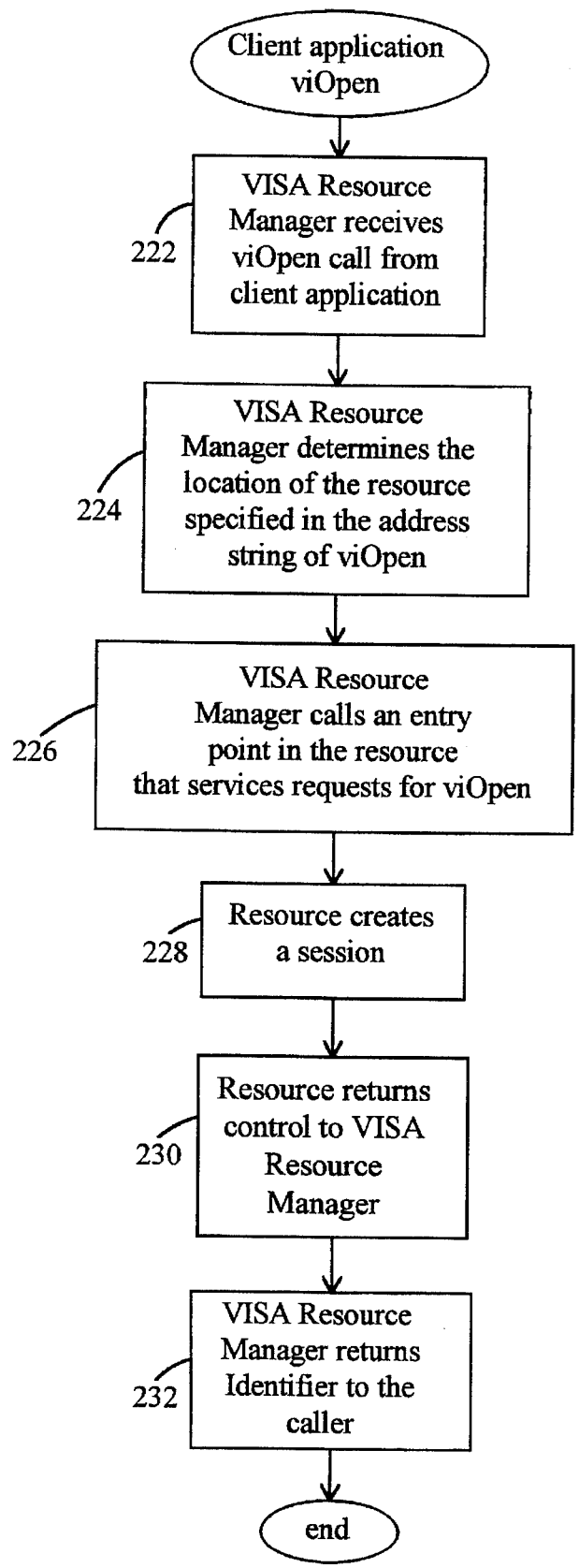
FIG. 17A is a flowchart diagram illustrating the steps performed by a VISA system when a client application uses the viOpen operation.
Figure 17B:
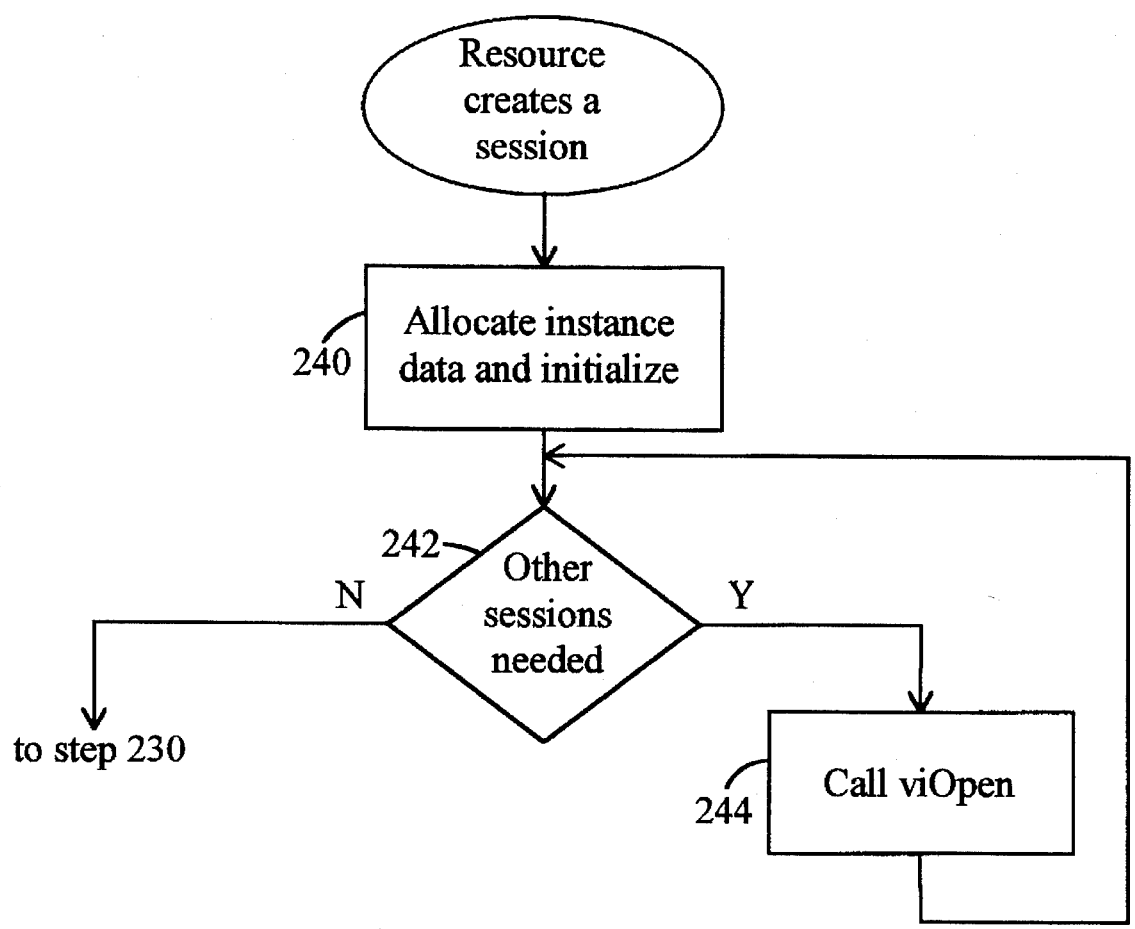
FIG. 17B is a flowchart diagram of a resource creating a session performed in step 228 of FIG. 17A.

FIGS. 17A–B illustrates operation when a client begins using a VISA system to create an application according to the present invention. Referring now to FIGS. 17A–B, a diagram illustrating operation of a VISA system when a viOpen instruction is received from a client application is shown. A client begins an application or session with a viOpen instruction. The viOpen instruction instructs the VISA Resource Manager 140 to connect the user's application to a desired resource. The operation of the viOpen operation illustrated in FIG. 17A is discussed in conjunction with FIG. 18.

Figure 18:
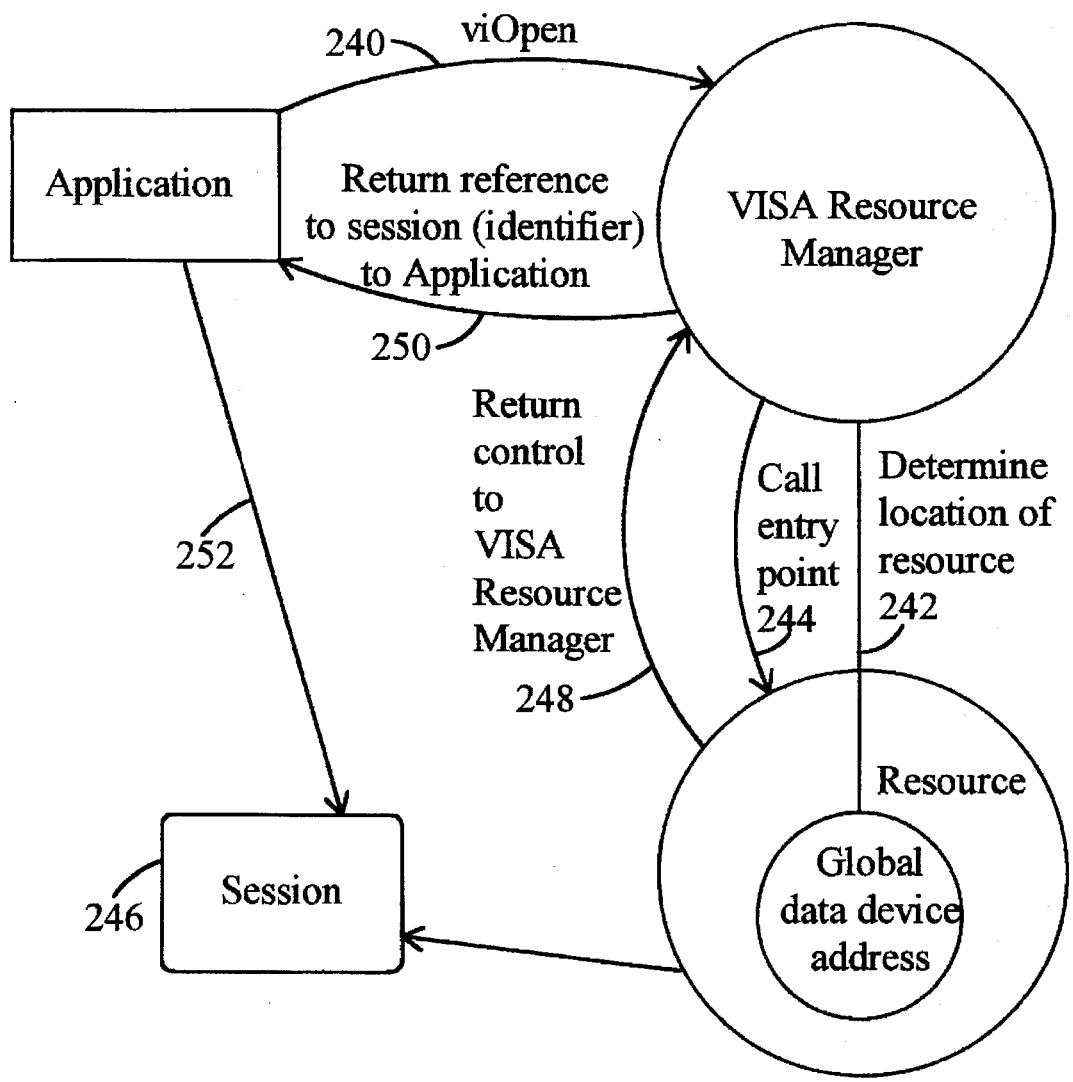
FIG. 18 illustrates the steps performed in FIG. 17A when a viOpen operation is used.

When a system according to the present invention receives a viOpen instruction in step 222, then in step 224 the VISA Resource Manager 140 determines the location of the resource specified in the address string of the viOpen instruction. In FIG. 18, the client application performing a viOpen operation on VISA Resource Manager is shown at 240, and step 124 where the VISA Resource Manager 140 determines the location of the resource is shown at 242. In step 226 the VISA Resource Manager 140 calls an entry point in the resource that services requests for the viOpen operation. This step is illustrated at 244 in FIG. 18. In step 228 the resource creates a session, this session being shown at 246 in FIG. 18. As described above, a session is essentially an instance of a resource. Creating a session involves creating data that is needed for a particular instance of that resource.

In step 230 the resource returns control to the VISA Resource Manager 140, and this is shown at 248 in FIG. 18. In step 232 the VISA Resource Manager 140 returns a reference or identifier to the user's application. This reference is provided in the variable "session i.d." to the user application, as shown at 250 in FIG. 18. The application can then use this session i.d. value to communicate with the resource, as shown at 252 in FIG. 18.

FIG. 17B illustrates more detail regarding how a resource creates a session in step 228 of FIG. 17A. As shown, when a resource creates a session the resource allocates instance data and initializes the session in step 240. In step 242 the resource determines if other sessions are needed in step 242. If so, then viOpen is called on those other resources in step 244 and control returns to step 242. If other sessions are not needed, then control advances to step 230 in FIG. 17A. It is noted that, if sessions to other resources are needed, when those sessions are actually created is indeterminate. If in order to create the data for a particular session it is first necessary to first open sessions to other resources, then these sessions are opened prior to the particular session. However, if in order to open these sessions it is necessary to first define how much space is available to create data, then these sessions may be opened after opening the particular session.

Non-VISA Application Opening a Session to VISA Resources

Figure 19:
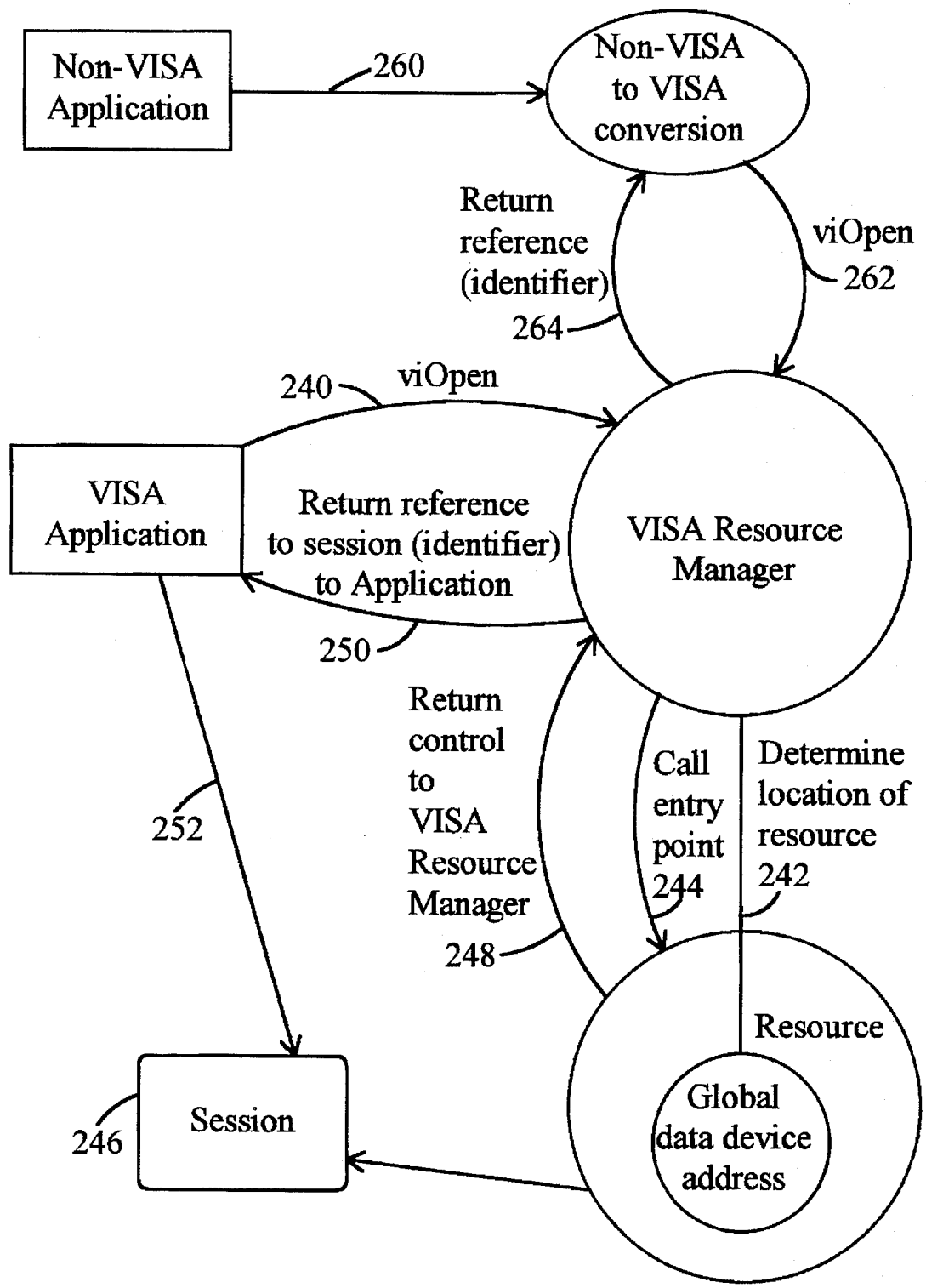
FIG. 19 illustrates the steps performed when a non-VISA application opens a session to a VISA resource using the Non-VISA to VISA conversion method of the present invention

FIG. 19 is a diagram similar to FIG. 18, but also shows how a non-VISA application, such as an application written for the NI-VXI driver level library, undergoes a conversion according to the present invention that enables it to operate in a VISA system. As shown, a non-VISA application which was developed according to a different software architecture or different driver level library such as NI-VXI, can open sessions with VISA resources within a VISA system by means of the non-VISA to VISA conversion block. When the Non-VISA to VISA conversion block issues a viOpen operation, the VISA system performs the steps shown in FIG. 19 and described above with respect to FIG. 18, except that the reference or session identifier is returned to the Non-VISA to VISA conversion block instead of to a VISA application. The non-VISA to VISA conversion block also receives function calls from the non-VISA application and invokes various operations on resources in the VISA system to implement the steps in the non-VISA application. In the preferred embodiment, the non-VISA application is an application developed according to the NI-VXI driver level library from National Instruments. The operation of the non-VISA to VISA conversion block in enabling applications based on NI-VXI driver level software to operate in a VISA system is described below and is also described in Appendix 1, and pseudocode for the method is comprised in Appendix 2.

NI-VXI

The NI-VXI driver level software does not have a concept of sessions to resources. Rather the first instruction in an NI-VXI application is a call to the InitVXIlibrary function, which initializes all of the various functions in the NI-VXI library to be accessed by the respective application. In contrast, as described above, a VISA system is session based, wherein sessions are created to resources on an as-needed basis. The present invention comprises a system and method which intelligently performs session management when NI-VXI function calls are received.

Mapping System and Method

Figure 20:
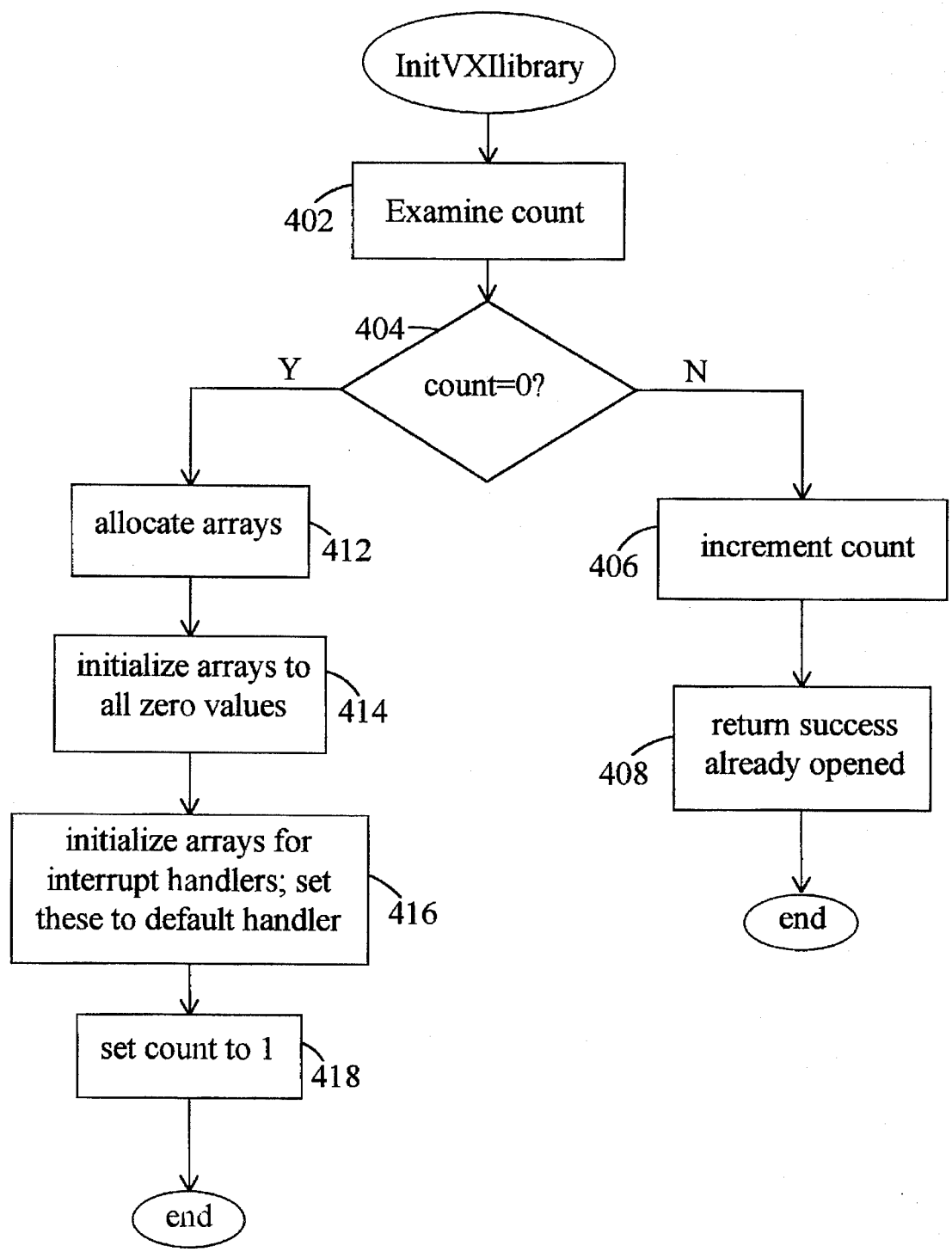
FIG. 20 is a flowchart diagram illustrating mapping of the NI-VXI function call InitVXIlibrary to a VISA system.

Referring now to FIG. 20, a flowchart diagram illustrating operation of the mapping system and method of the present invention when a call to the InitVXIlibrary function is made by an application is shown. In step 402 the method examines a count variable which keeps track of how many times the InitVXIlibrary function has been invoked. If the count variable is determined to be non-zero in step 404, then in step 406 the count variable is incremented and in step 408 a success value is returned, indicating that the VXI library has already been opened. Operation then completes.

If in step 404 the count variable is determined to equal zero, meaning that the InitVXIlibrary function has not yet been called, then in step 412 the mapping method allocates one or more data structures, preferably one or more arrays for session information. It is noted that any of various types of data structures may be allocated for storing session information, and arrays are allocated in the preferred embodiment. These arrays are subsequently used to keep track of sessions opened to VISA resources.

In one embodiment of the present invention, the mapping system and method allocates one or more data structures, preferably one or more arrays, for each possible logical address within the system. In other words, the mapping method allocates 256 different arrays for each of the possible logical addresses of devices within the VXI system. The use of 256 arrays enables the system to index into the array based on the logical address of a VXI extender. For example, if a VXI-MXI extender having logical address 32 is inserted into the system, the mapping code can index into array 32 for session information. In another embodiment, the mapping method allocates arrays for each type of hardware resource. For example, the maximum number of logical addresses within a system is 256. Thus, a maximum of 256 VXI chassis or mainframes can be included in any VXI system and accordingly 256 arrays are allocated. Also, each VXI mainframe includes up to fourteen trigger lines, and up to seven interrupt lines and thus the system in one embodiment allocates 256×14 arrays for each of these possible trigger lines and allocates 256×7 arrays for each possible interrupt line, etc. In an alternate embodiment, the mapping system and method of the present invention presumes that there is a maximum of 20 mainframes within the system and thus the method allocates 20×7, or 140 arrays for interrupt resources and 20×14 or 280 arrays for trigger resources.

In another embodiment of the invention, the mapping system and method queries the VXI system to determine how many mainframes are present and allocates arrays based on the number of VXI mainframes and devices present. As mentioned above, there are a maximum of 14 trigger lines and 7 interrupt lines per VXI chassis. Thus, once the system determines that a number N of VXI mainframes are present within the system, in one embodiment the present invention allocates arrays for each of the mainframes including up to N×7 interrupt lines and N×14 trigger lines. Various other methods may be used for allocating arrays for session data, as desired.

In step 414 the system initializes these arrays to initial values, preferably 0 values. In step 416 the method initializes arrays for the interrupt handlers and sets these arrays to point to a respective default handler. In step 418 the system sets the count variable equal to 1, and operation then completes.

Figure 21:
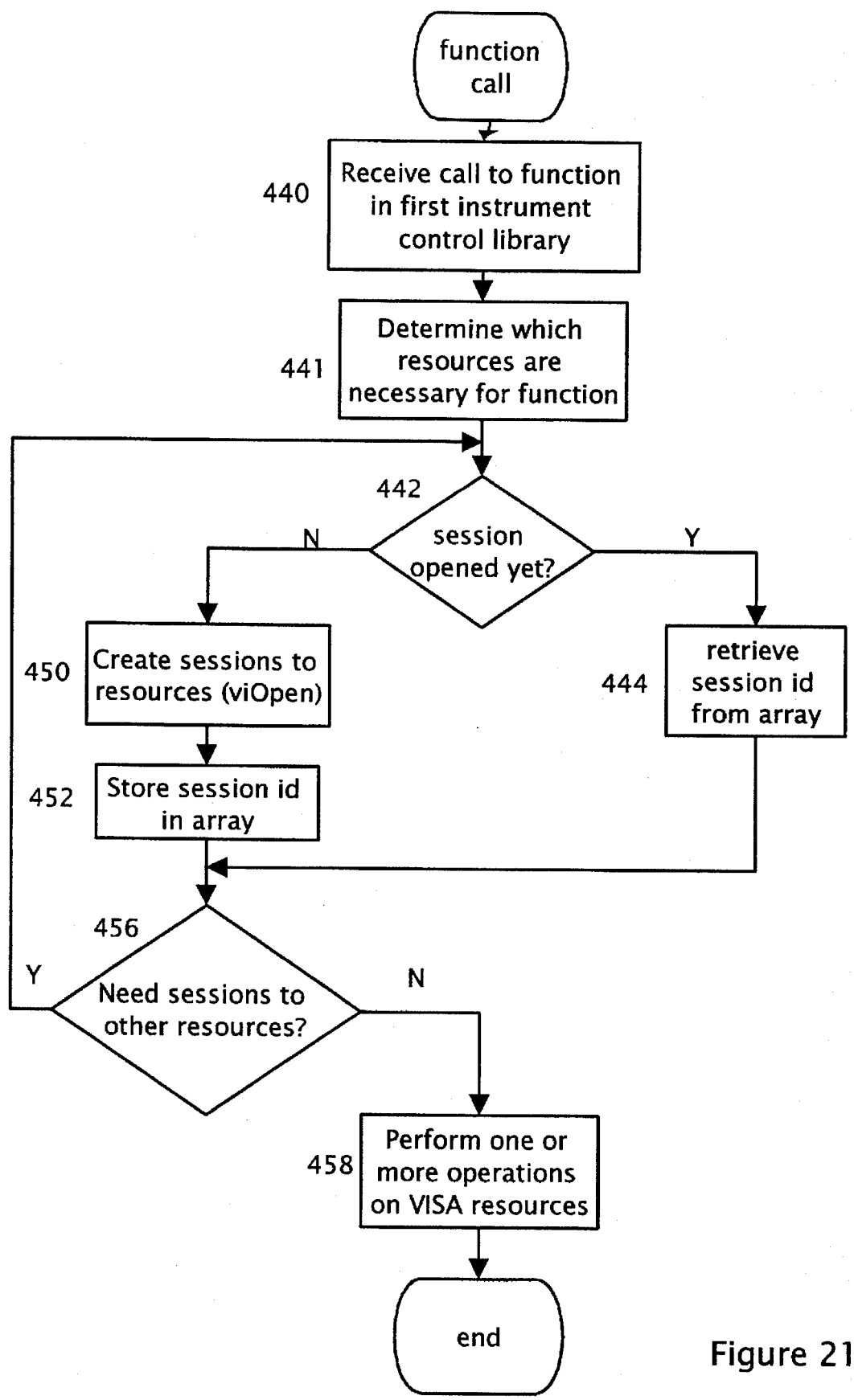
FIG. 21 is a flowchart diagram illustrating mapping of NI-VXI function calls to a VISA system.

Referring now to FIG. 21, a flowchart diagram illustrating operation of the mapping method when a call to a function in the NI-VXI library is received is shown. When a call to a function in the NI-VXI library is received, this function will generally map to one or more VISA resources. In step 440 the method receives a call to a function in the first instrument control library. In step 441 the method determines which VISA resource(s) are necessary for this called function. It is noted that these particular VISA resources may be predetermined at compile time or may be determined dynamically at runtime based on parameters in the function call. In step 442 the method determines if sessions have been opened to these one or more resources. This step of determining if a session has been opened yet to a respective VISA resource involves examining a respective array maintained by the mapping method to determine if the session has yet been opened. If sessions have been opened to all of the one or more resources required for the function call, then the method retrieves the session id from the respective array in step 444 and then advances to step 456.

If sessions have not been opened to the one or more VISA resources necessary to implement the function call, then the method opens sessions to the one or more resources. In step 450 the method performs a viOpen operation on the resource manager to create a session to the respective resource. In step 452 the method stores the session id created by the viOpen instruction in a respective array. Here the session id is stored in a respective array so that the mapping method can maintain information about the VISA resources in which sessions have been opened. In one embodiment, only the session id is stored in the respective array. In this embodiment, a non-zero value for an element in the array indicates that a session has been opened to the respective resource, and a value of zero indicates that no session has yet been opened. In another embodiment, the method in step 452 stores a session id and a Boolean value in the array, and the Boolean value indicates whether or not a session has yet been opened. In this embodiment, the Boolean value is examined in step 442 to determine if a session has been opened to the resource. In step 456 the method determines if other sessions are required to be created to other resources. If yes, then the method returns to step 442 and determines if the session has yet been opened on the desired resource. If yes, then the session id is retrieved from the array in step 444 and operation advances to step 456. If no, then steps 450 and 452 are repeated. The above sequence repeats until sessions have been opened to all of the necessary VISA resources for this function call.

The method of the present invention may open sessions to a single VISA resource wherein this single resource uses a plurality of other resources. For example, when a call to the NI-VXI word serial write function is received, the method may open a session to a single INSTR resource which in turn opens sessions to read, write, trigger, poll and clear resources. The method also preferably intelligently manages and groups sessions for optimization and increased efficiency. Further, in one embodiment, the method dynamically allocates arrays as needed during session creation.

In general, calls to functions in the NI-VXI driver level library map to operations on one or more VISA resources in a VISA system. The VISA resources necessary for a respective call to a function in the NI-VXI library is defined in the mapping document included as Appendix 1 to the present application. However, in one embodiment, the system of the present invention dynamically opens more or less sessions to respective VISA resources for optimization purposes in order to use less memory. For example, the system and method of the present invention opens sessions on a subset of the necessary resources and uses other sessions that have been already created in order to optimize operation and reduce memory requirements. Alternatively, in some instances the method of the present invention opens additional sessions to a resource even though current sessions already exist in order to isolate sessions from each other in performing certain operations.

In one embodiment, when a call to a function is received and a session is opened to one or more VISA resources, the method also intelligently determines if sessions are likely to be needed to other VISA resources and if new sessions are likely to be needed, these sessions are also opened at this time. This obviates the necessity of opening up sessions at a later time, and thus increases system efficiency. For example, when a call to a word serial write function is received, the method preferably opens up an INSTR resource, which provides read, write, trigger, poll, and clear resources. The method may also use the same session for all word serial accesses to the same device, for example, the session uses the INSTR resource for all word serial writes and reads to a device, and thus the session created for the word serial write function using the INSTR resource can be used for the word serial read. Alternatively, the method can keep separate sessions to the specific resources required. In this embodiment, when a viWrite is necessary, the method opens a session to just the write resource for that device. Later, when a read to that device is required, the method opens a session to the read resource of the device. In this embodiment, separate arrays may be needed for each of the type of sessions to a device. In another alternative embodiment, the method uses the virtual instrument control organizer (VICO) in a VISA system and only maintains one session per logical address. When it is necessary to access a new resource or feature of a device, the method in this embodiment determines if the resource is attached to that session, and if not, the method creates the session and attaches it to the VICO resource. In this embodiment, the method is only required to keep track of one VICO session per logical address and dynamically attaches sessions to this single VICO session.

Once sessions have been created to all of the necessary resources in step 456, then in step 458 the method invokes one or more operations on the VISA resources, and these one or more operations are performed on the one or more VISA resources to implement the functionality indicated by the call to the NI-VXI library function. These operations may involve getting or setting attributes or reading or writing instruments or any other types of operations necessary to implement the functionality of the NI-VXI function. For more information on the VISA operations that are performed in response to calls to NI-VXI functions, please see the mapping document in Appendix 1 and the pseudocode listing in Appendix 2.

Figure 22:
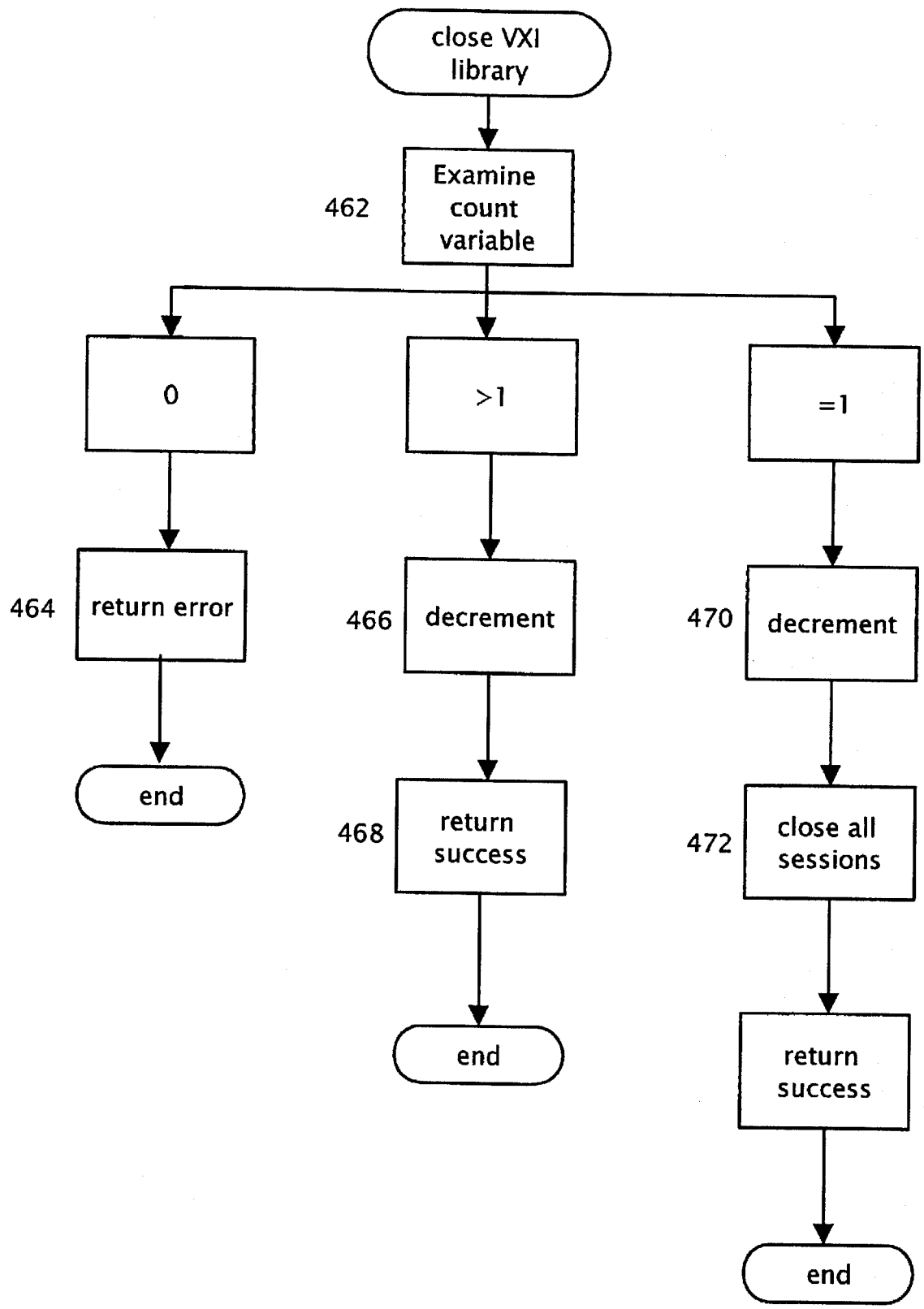
FIG. 22 is a flowchart diagram illustrating mapping of the NI-VXI function call CloseVXIlibrary to a VISA system.

Referring now to FIG. 22, a flowchart diagram illustrating operation of the mapping method when a call to the NI-VXI library function CloseVXIlibrary is shown. In step 462 the method examines the count variable to determine the number of times that the InitVXIlibrary function has been called. If the count variable is equal to zero, then the mapping method returns an error in step 464. If the count variable is greater than 1, then in step 466 the method decrements the count variable and in step 468 returns a success indicator. If the count variable is equal to 1, then in step 470 the method decrements the count variable and in step 472 closes all opened sessions. In step 474 the method returns a success value, and operation completes.

Figure 23:
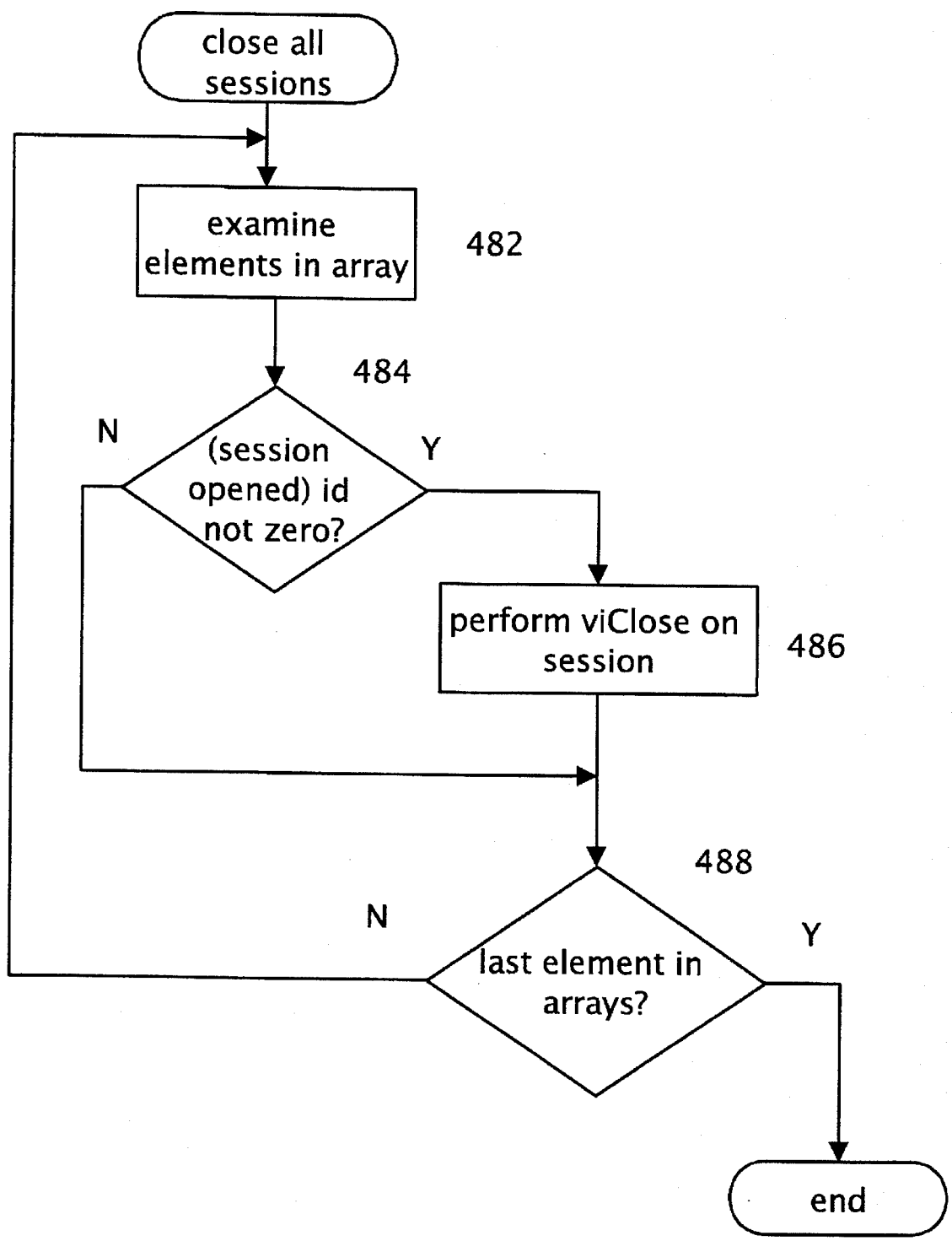
FIG. 23 is a flowchart diagram illustrating closing of all opened VISA sessions.

Referring now to FIG. 23, a flowchart diagram illustrating operation of the mapping method closing all sessions is shown. In step 482 the method examines an element in an array and in step 484 the method determines if a session is opened to a respective resource. In an embodiment where the array element is zero to indicate no session has been opened and is non-zero to indicate a valid session, the method determines if the array element is equal to zero. In an alternate embodiment where a Boolean variable is used to indicate whether a session has been opened, the method examines the Boolean variable to determine if a session has been opened. If a session is determined to not be opened on the respective array element being examined in step 484, then the method advances to step 488 to determine if this is the last element in the array. If the particular array element being examined indicates that a session has been opened on the resource, then in step 486 the method performs a viClose operation on the session. In step 488 the method determines if this is the last element in all of the arrays being examined. If not, the method returns to step 482 and examines the next element in the array or an element in the next array. The above steps are performed for all of the elements in each of the arrays. In step 488 if the respective array element examined is the last element in all of the arrays, then operation completes.

Conclusion

Therefore, a system and method for mapping calls to driver level functions in the NI-VXI library to a VISA system is shown and described. The NI-VXI driver level library is not session based, but rather includes a global InitVXIlibrary function which initializes access to all functions in the NI-VXI driver level library. The system and method of the present invention maps calls to functions in the NI-VXI library to operations on VISA resources. The system and method of the present invention also intelligently manages sessions to VISA resources to allow calls to functions in the NI-VXI library to properly map to operations on VISA resources. Therefore, the present invention enables applications written for the NI-VXI driver level library to operate properly within a VISA system.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for mapping calls to functions in a first driver level library to the Virtual Instrument Software Architecture (VISA) driver level library, wherein the method is performed in an instrumentation system including a computer system, the method comprising the computer-implemented steps of:

receiving a call to a first function in said first driver level library to initialize said first driver level library;

allocating one or more data structures for storing session identifiers in response to receiving said call to said first function in said first driver level library to initialize said first driver level library;

receiving a call to a second function in said first driver level library, wherein said call to said second function in said first driver level library maps to one or more resources in said VISA driver level library;

determining if sessions have been opened to said one or more VISA resources;

opening sessions to said one or more VISA resources if sessions have not yet been opened to said one or more VISA resources, wherein said step of opening creates session identifiers for each session to said one or more VISA resources;

storing said session identifiers in said one or more data structures created in said step of allocating, wherein said step of storing is performed after said step of opening sessions to said one or more VISA resources; and performing one or more operations on said one or more VISA resources to implement functionality indicated by said call to said second function in said first driver level library.

2. The method of claim 1, further comprising:

retrieving one or more sessions identifiers from one or more of said one or more data structures if one or more of said one or more sessions have already been opened to one or more of said one or more VISA resources, wherein said step of retrieving is performed after said step of determining if sessions have been opened to said one or more VISA resources.

3. The method of claim 1, wherein the instrumentation system includes one or more instruments;

wherein said step of allocating said one or more data structures comprises:

determining a number of said one or more instruments comprised in the instrumentation system; and allocating said one or more data structures based on said determined number of said one or more instruments.

4. The method of claim 1, further comprising:

dynamically allocating one or more data structures for storing session identifiers, wherein said step of dynamically allocating is performed after said step of receiving said call to said second function in said first driver level library.

5. The method of claim 1, further comprising the step of:

determining said one or more VISA resources necessary for said functionality indicated by said call to said second function in said first driver level library, wherein said step of determining said one or more resources is performed after said step of receiving said call to said second function in said first driver level library.

6. The method of claim 1, further comprising:

initializing said one or more data structures to a beginning value after said step of allocating.

7. The method of claim 1, further comprising:

receiving a call to a third function in said first driver level library to close said first driver level library; and closing all sessions created to said VISA resources in response to receiving said call to said third function in said first driver level library to close said first driver level library.

8. The method of claim 7, wherein said step of closing all sessions comprises:

examining said data structures to determine which sessions are open to said VISA resources; and performing a close operation to close said sessions to said VISA resources for each of said sessions determined to be opened to said VISA resources.

9. The method of claim 7, wherein said third function is closeVXIlibrary.

10. The method of claim 1, further comprising:

examining a count variable indicative of a number of times said call to said first function which initializes said first driver level library has been called;

performing said step of allocating if said count variable is determined to equal zero in said step of examining;

setting said count variable equal to 1 after said step of allocating if said count variable was determined to equal zero in said step of examining said value of said count variable; and incrementing said count variable and returning a success value if said count variable is determined to not equal zero in said step of examining.

11. The method of claim 10, further comprising:

receiving a call to a third function in said first driver level library to close said first driver level library;

examining said count variable after said step of receiving said call to said third function in said first driver level library to close said first driver level library;

returning an error value if said count variable equals zero;

decrementing said count variable and returning a success value if said count variable is greater than 1; and decrementing said count variable and closing all sessions to said VISA resources if said count variable equals 1.

12. The method of claim 1, further comprising:

initializing one or more of said one or more data structures for interrupt handlers; and setting said one or more of said one or more data structures to a default handler.

13. The method of claim 1, wherein said steps of receiving a call to a second function, determining if sessions have been opened, opening sessions to said one or more VISA resources if sessions have not yet been opened, storing said session identifiers, and performing said one or more operations are performed for a plurality of received calls to functions in said first driver level library.

14. The method of claim 1, wherein said instrumentation system includes one or more instruments, the method further comprising:

executing an application on the computer system to control said one or more instruments, wherein said application was developed to use said first driver level library, wherein said application includes said call to said first function in said first driver level library and includes calls to one or more of said second functions in said first driver level library, wherein said application is designed to control said instrumentation system in a first manner;

wherein said step of performing said one or more operations on said one or more VISA resources is performed one or more times to control said instrumentation system in said first manner.

15. The method of claim 1, wherein said one or more data structures comprise one or more arrays.

16. The method of claim 1, wherein said first driver level library is the NI-VXI driver level library.

17. The method of claim 16, wherein said first function is InitVXIlibrary.

18. A method for mapping calls to functions in a VXI driver level library to the Virtual Instrument Software Architecture (VISA) driver level library, wherein the method is performed in an instrumentation system including a computer system, the method comprising the computer-implemented steps of:

receiving a call to an initialization function in said VXI driver level library to initialize said VXI driver level library;

allocating one or more data structures for storing session identifiers in response to receiving said call to said initialization function in said VXI driver level library to initialize said VXI driver level library;

receiving a call to a function in said VXI driver level library, wherein said call to said function in said VXI driver level library maps to one or more resources in said VISA driver level library;

determining if sessions have been opened to said one or more VISA resources;

opening sessions to said one or more VISA resources if sessions have not yet been opened to said one or more VISA resources, wherein said step of opening creates session identifiers for each session to said one or more VISA resources;

storing said session identifiers in said one or more data structures created in said step of allocating, wherein said step of storing is performed after said step of opening sessions to said one or more VISA resources; and performing one or more operations on said one or more VISA resources to implement functionality indicated by said call to said function in said VXI driver level library.

19. The method of claim 18, further comprising:

retrieving one or more sessions identifiers from one or more of said one or more data structures if one or more of said one or more sessions have already been opened to one or more of said one or more VISA resources, wherein said step of retrieving is performed after said step of determining if sessions have been opened to said one or more VISA resources.

20. The method of claim 18, wherein the instrumentation system includes one or more instruments;

wherein said step of allocating said one or more data structures comprises:
determining a number of said one or more instruments comprised in the instrumentation system; and
allocating said one or more data structures based on said determined number of said one or more instruments.

21. The method of claim 18, further comprising:

dynamically allocating one or more data structure for storing session identifiers, wherein said step of dynamically allocating is performed after said step of receiving said call to said initialization function in said VXI driver level library.

22. The method of claim 18, further comprising the step of:

determining said one or more VISA resources necessary for said functionality indicated by said call to said function in said VXI driver level library, wherein said step of determining said one or more resources is performed after said step of receiving said call to said function in said VXI driver level library.

23. The method of claim 18, further comprising:

initializing said one or more data structures to a beginning value after said step of allocating.

24. The method of claim 18, further comprising:

initializing one or more of said one or more data structures for interrupt handlers; and setting said one or more of said one or more data structures to a default handler.

25. The method of claim 18, further comprising:

receiving a call to a close function in said VXI driver level library to close said VXI driver level library; and closing all sessions created to said VISA resources in response to receiving said call to said close function in said VXI driver level library to close said VXI driver level library.

26. The method of claim 25, wherein said step of closing all sessions comprises:

examining said data structures to determine which sessions are open to said VISA resources; and performing a close operation to close said sessions to said VISA resources for each of said sessions determined to be opened to said VISA resources.

27. The method of claim 18, wherein said steps of receiving a call, determining if sessions have been opened, opening sessions to said one or more VISA resources if sessions have not yet been opened, storing said session identifiers, and performing said one or more operations are performed for each received call to a function in said VXI driver level library.

28. The method of claim 18, wherein said instrumentation system includes one or more instruments, the method further comprising:

executing an application on the computer system to control said one or more instruments, wherein said application was developed to use said VXI driver level library, wherein said application includes said call to said initialization function in said VXI driver level library and includes calls to one or more of said functions in said VXI driver level library, wherein said application is designed to control said instrumentation system in a first manner;

wherein said step of performing said one or more operations on said one or more VISA resources is performed one or more times to control said instrumentation system in said first manner.

29. The method of claim 18, wherein said VXI driver level library is the NI-VXI driver level library.

30. A method for mapping calls to functions in a first driver level library to the Virtual Instrument Software Architecture (VISA) driver level library, wherein the method is performed in an instrumentation system including a computer system, the method comprising the computer-implemented steps of:

receiving a call to an initialization function in said first driver level library to initialize said first driver level library;

allocating one or more data structures for storing session identifiers in response to receiving said call to said initialization function in said first driver level library to initialize said first driver level library;

receiving calls to functions in said first driver level library, wherein each of said calls to said functions in said first driver level library map to one or more resources in said VISA driver level library;

for each of said calls to said functions in said first driver level library:

determining if sessions have been opened to said one or more VISA resources;

opening sessions to said one or more VISA resources if sessions have not yet been opened to said one or more VISA resources, wherein said step of opening creates session identifiers for each session to said one or more VISA resources;

storing said session identifiers in said one or more data structures created in said step of allocating, wherein said step of storing is performed after said step of opening sessions to said one or more VISA resources; and performing one or more operations on said one or more VISA resources to implement functionality indicated by said call to said function in said first driver level library.

31. The method of claim 30, wherein, for each of said calls to said functions in said first driver level library, the method further comprises:

retrieving one or more sessions identifiers from one or more of said one or more data structures if one or more of said one or more sessions have already been opened to one or more of said one or more VISA resources, wherein said step of retrieving is performed after said step of determining if sessions have been opened to said one or more VISA resources.

32. The method of claim 30, wherein the instrumentation system includes one or more instruments;

wherein said step of allocating said one or more data structures comprises:

determining a number of said one or more instruments comprised in the instrumentation system; and allocating said one or more data structures based on said determined number of said one or more instruments.

33. The method of claim 30, wherein, for one or more of said calls to said functions in said first driver level library, the method further comprises:

dynamically allocating one or more data structures for storing session identifiers, wherein said step of dynamically allocating is performed after said step of receiving said call to said function in said first driver level library.

34. The method of claim 30, wherein, for each of said calls to said functions in said first driver level library, the method further comprises:

determining said one or more VISA resources necessary for said functionality indicated by said call to said function in said first driver level library, wherein said step of determining said one or more resources is performed after said step of receiving said call to said function in said first driver level library.

35. The method of claim 30, further comprising:

receiving a call to a close function in said first driver level library to close said first driver level library; and closing all sessions created to said VISA resources in response to receiving said call to said close function in said first driver level library to close said first driver level library.

36. The method of claim 30, wherein said step of closing all sessions comprises:

examining said data structures to determine which sessions are open to said VISA resources; and performing a close operation to close said sessions to said VISA resources for each of said sessions determined to be opened to said VISA resources.

37. The method of claim 30, wherein said instrumentation system includes one or more instruments, the method further comprising:

executing an application on the computer system to control said one or more instruments, wherein said application was developed to use said first driver level library, wherein said application includes said calls to said functions in said first driver level library, wherein said application is designed to control said instrumentation system in a first manner;

wherein said step of performing said one or more operations on said one or more VISA resources is performed one or more times to control said instrumentation system in said first manner.

38. The method of claim 30, wherein said first driver level library is the NI-VXI driver level library.

39. An instrumentation system which executes an application developed for a first instrument control library using an instrument control library based on the Virtual Instrument Software Architecture (VISA), wherein the instrumentation system comprises:

a computer system comprising a CPU and memory;

one or more instruments coupled to the computer system;

a VISA instrument control library comprised in said memory of said computer system, said VISA instrument control library including a plurality of instrument control resources for controlling instrument device capabilities of said one or more instruments, wherein said VISA instrument control library includes one or more operations that can be performed on said plurality of resources;

wherein an application executes on the computer system to control the instrumentation system, wherein said application was developed to use said first instrument control library and wherein said application is designed to control the instrumentation system in a first manner;

a mapping library comprised in said memory of said computer system which receives calls to functions in said first instrument control library from said application and maps said calls to functions in said first instrument control library to one or more operations on one or more of said plurality of instrument control resources in said VISA instrument control library, wherein said mapping library comprises:

means for receiving calls to functions in said first driver level library;

means for allocating one or more data structures for storing session identifiers, wherein said means for allocating operates in response to said receiving means receiving a call to a function in said first driver level library to initialize said first driver level library;

means for determining if sessions have been opened to one or more of said plurality of instrument control resources;

means for opening sessions to said one or more of said plurality of instrument control resources if sessions have not yet been opened to said one or more of said plurality of instrument control resources, wherein said opening creates session identifiers for each session to said one or more of said plurality of instrument control resources;

means for storing said session identifiers in said one or more data structures; and means for performing one or more operations on said one or more of said plurality of instrument control resources to implement functionality indicated by said calls to said functions in said first driver level library;

wherein said means for determining, means for opening, means for storing, and means for performing operate in response to said receiving means receiving calls to functions in said first driver level library;

wherein said one or more operations are performed on said one or more of said plurality of instrument control resources in said VISA instrument control library to control the instrumentation system in said first manner.

40. The instrumentation system of claim 39, wherein said mapping library further comprises:

means for retrieving one or more sessions identifiers from one or more of said one or more data structures if one or more of said one or more sessions have already been opened to said one or more of said plurality of instrument control resources.

41. The instrumentation system of claim 39, wherein said means for allocating comprises:

means for determining a number of said one or more instruments comprised in the instrumentation system; and means for allocating said one or more data structure based on said determined number of said one or more instruments.

42. The instrumentation system of claim 39, wherein said mapping library further comprises:

means for dynamically allocating one or more data structures for storing session identifiers.

43. The instrumentation system of claim 39, wherein said mapping library further comprises:

means for determining said one or more of said plurality of instrument control resources necessary for functionality indicated by a call to a function in said first driver level library.

44. The instrumentation system of claim 39, wherein said mapping library further comprises:

means for closing all sessions created to said instrument control resources in response to receiving a call to a function in said first driver level library to close said first driver level library.

45. The instrumentation system of claim 44, wherein said means for closing all sessions comprises:

means for examining said data structures to determine which sessions are open to said instrument control resources; and means for performing a close operation to close said sessions to said instrument control resources for each of said sessions determined to be opened to said instrument control resources.

46. The instrumentation system of claim 39, wherein an application executes on the computer system to control said one or more instruments, wherein said application was developed to use said first driver level library, wherein said application includes said calls to said functions in said first driver level library, wherein said application is designed to control said instrumentation system in a first manner;

wherein said mapping library maps said calls to said functions in said first instrument control library to said one or more operations on said one or more of said plurality of instrument control resources to control said instrumentation system in said first manner.

47. The instrumentation system of claim 39, wherein said first driver level library is the NI-VXI driver level library.

* * * * *